United States Patent
Yamatsu

(10) Patent No.: US 7,936,647 B2
(45) Date of Patent: May 3, 2011

(54) OPTICAL INFORMATION RECORDING/REPRODUCING DEVICE AND ASSOCIATED METHOD FOR INCREASING RECORDING/REPRODUCING SPEED

(75) Inventor: Hisayuki Yamatsu, Tokyo (JP)

(73) Assignee: Sony Corporation, Tokyo (JP)

( * ) Notice: Subject to any disclaimer, the term of this patent is extended or adjusted under 35 U.S.C. 154(b) by 329 days.

(21) Appl. No.: 12/137,035

(22) Filed: Jun. 11, 2008

(65) Prior Publication Data
US 2009/0003153 A1    Jan. 1, 2009

(30) Foreign Application Priority Data
Jun. 29, 2007 (JP) ................. P2007-172904

(51) Int. Cl.
*G11B 7/00* (2006.01)
(52) U.S. Cl. .................. 369/44.38; 369/103
(58) Field of Classification Search .......... None
See application file for complete search history.

(56) References Cited

U.S. PATENT DOCUMENTS

| | | | | |
|---|---|---|---|---|
| 4,843,494 A | * | 6/1989 | Cronin et al. ........... | 360/77.03 |
| 5,253,242 A | * | 10/1993 | Satoh et al. ............ | 369/47.54 |
| 5,255,260 A | * | 10/1993 | Yamada et al. .......... | 369/199 |
| 5,420,690 A | * | 5/1995 | Koishi ................... | 386/105 |
| 5,506,825 A | * | 4/1996 | Gushima et al. ......... | 386/96 |
| 6,995,882 B2 | * | 2/2006 | Horimai ................. | 359/2 |
| 7,085,026 B2 | * | 8/2006 | Horimai ................. | 359/11 |
| 7,463,575 B2 | * | 12/2008 | Akiyama et al. ......... | 369/284 |
| 2002/0114027 A1 | * | 8/2002 | Horimai ................. | 359/11 |
| 2009/0003153 A1 | * | 1/2009 | Yamatsu ................. | 369/44.38 |

FOREIGN PATENT DOCUMENTS

| | | |
|---|---|---|
| JP | 5-205285 | 8/1993 |
| JP | 6-282846 | 10/1994 |
| JP | 11-96668 | 4/1999 |
| JP | 11-328737 | 11/1999 |
| JP | 2002-312958 | 10/2002 |
| JP | 2007-102185 | 4/2007 |

* cited by examiner

*Primary Examiner* — Peter Vincent Agustin
(74) *Attorney, Agent, or Firm* — Oblon, Spivak, McClelland, Maier & Neustadt, L.L.P.

(57) ABSTRACT

An optical information recording device includes: a section that acquires recording information that should be recorded on an optical information recording medium on which information are recorded by forming a recording mark at a position where an optical beam is focused on and from which the information are reproduced based on the reflectance of the recording mark; a section including at least one or more one-surface beam emission sections that emit a recording beam according to part of the recording information to one surface of the recording medium and focus the beam on a target position to form the recording mark; and an section including at least one or more other-surface beam emission sections that emit an recording beam according to the rest of the recording information to the other surface of the recording medium and focus the beam on a target position to form the recording mark.

8 Claims, 22 Drawing Sheets

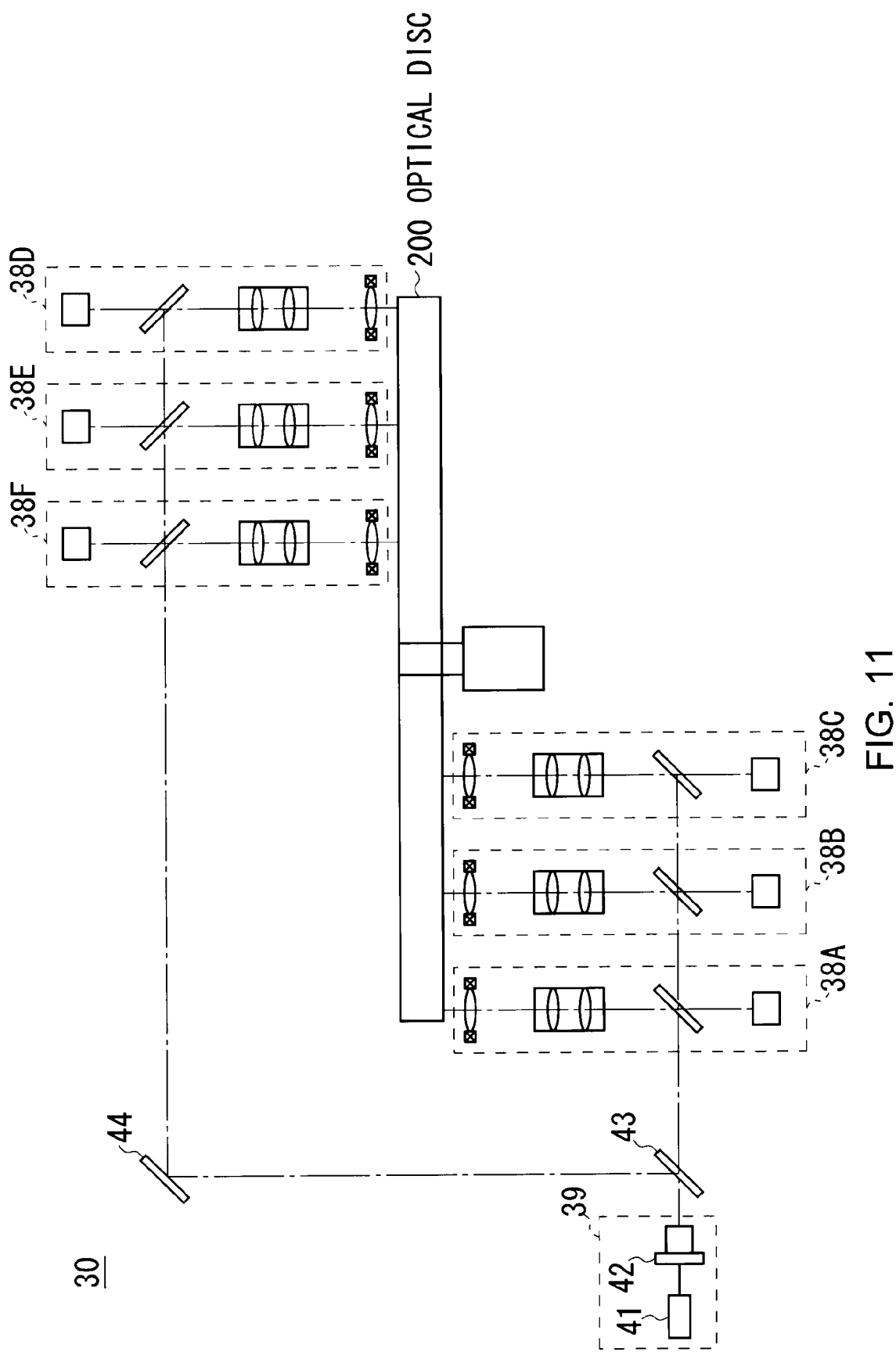

OPTICAL INFORMATION RECORDING/REPRODUCING DEVICE AND ASSOCIATED METHOD FOR INCREASING RECORDING/REPRODUCING SPEED

CROSS REFERENCES TO RELATED APPLICATIONS

The present invention contains subject matter related to Japanese Patent Application JP2007-172904 filed in the Japanese Patent Office on Jun. 29, 2007, the entire contents of which being incorporated herein by reference.

BACKGROUND OF THE INVENTION

1. Field of the Invention

The present invention relates to an optical information recording device, optical information recording method, optical information reproduction device and optical information reproduction method, and is preferably applied to an optical information recording and reproducing device that records information on a recording medium by using an optical beam and reproduces the information from the recording medium by using an optical beam, for example.

2. Description of the Related Art

As an optical information recording and reproducing device, an optical disc device is popular: The optical disc device uses a disc-shaped optical disc as an information recording medium, which includes Compact Disc (CD), Digital Versatile Disc (DVD) and "Blu-Ray Disc (Registered Trademark: also referred to as 'BD')."

The optical disc device is designed to record on an optical disc various types of information, such as various types of content (like music content and video content) and various types of data for computers. In recent years, the amount of information is increasing as the technique of high-definition images develops and the quality of sound improves. Since the number of contents to be recorded on one optical disc is increasing, the capacity of the optical disc may need to increase.

A method to increase the capacity of an optical disc is proposed in Jpn. Pat. Laid-open Publication No. 2006-78834 (FIG. 1): It employs a technique of causing the interference between two optical beams and forms a microscopic hologram in the recording medium to record information.

SUMMARY OF THE INVENTION

However, it takes time for the above optical disc device to form a hologram due to the chemical characteristics of the optical disc. Moreover, since there is an upper limit on the rotation speed of the optical disc in terms of the axial run-out of the optical disc, the optical disc device may not be able to increase the recording and reproducing speed.

The present invention has been made in view of the above points and is intended to provide an optical information recording device, optical information recording method, optical information reproduction device and optical information reproduction method capable of increasing the recording and reproducing speed with the use of an optical beam.

In one aspect of the present invention, an optical information recording device includes: an acquisition section that acquires recording information that should be recorded on an optical information recording medium on which information are recorded by forming a recording mark at a position where an optical beam is focused on and from which the information are reproduced based on the optical reflectance of the recording mark; a one-surface recording section including at least one or more one-surface beam emission sections that emit a one-surface recording beam according to part of the recording information to one surface of the optical information recording medium and focus the one-surface recording beam on a predetermined target position to form the recording mark, the one-surface recording section using the one-surface beam emission sections to form recording marks at the same time; and an other-surface recording section including at least one or more other-surface beam emission sections that emit an other-surface recording beam according to the rest of the recording information to the other surface of the optical information recording medium and focus the other-surface recording beam on a predetermined target position to form the recording mark, the other-surface recording section using the other-surface beam emission sections to form recording marks at the same time as the one-surface beam emission section does.

Therefore, the recording marks can be at least formed on both surfaces of the optical information recording medium at the same time.

In another aspect of the present invention, an optical information recording device includes: an acquisition section that acquires recording information that should be recorded on an optical information recording medium on which information are recorded by forming a recording mark at a position where the interference of two coherent optical beams occurs and from which the information are reproduced based on the optical reflectance of the recording mark; and a recording section including at least two or more beam collection sections, each of which forms the recording mark at a predetermined target position by using one-surface beam collection section that emits an one-surface recording beam according to part of the recording information to one surface of the optical information recording medium and focuses the one-surface recording beam on the target position and other-surface beam collection section that emits an other-surface recording beam coherent with the one-surface recording beam to the other surface of the optical information recording medium and focuses the other-surface recording beam on the target position.

Therefore, by using the interference of the optical beams, the recording marks can be at least formed at two or more positions on the optical information recording medium at the same time.

In another aspect of the present invention, an optical information reproduction device includes: an one-surface readout section including at least one or more one-surface beam receiving sections, each of which emits a one-surface readout beam for reading out information to one surface of an optical information recording medium on which information are recorded by forming a recording mark at a position where an optical beam is focused on and from which the information are reproduced based on the optical reflectance of the recording mark, focuses the one-surface readout beam on a predetermined target position inside the optical information recording medium, and receives a one-surface reflection beam as the reflection of the one-surface readout beam from the target position; an other-surface readout section including at least one or more other-surface beam receiving sections, each of which emits a other-surface readout beam for reading out information to the other surface of the optical information recording medium, focuses the other-surface readout beam on a predetermined target position inside the optical information recording medium, and receives a other-surface reflection beam as the reflection of the other-surface readout beam from the target position; and a reproduced information generation section that generates reproduced information from the result of receiving the beams by the one-surface readout section and the other-surface readout section.

Therefore, the recording marks can be at least reproduced from both surfaces of the optical information recording medium at the same time.

According to an embodiment of the present invention, the recording marks can be at least formed on both surfaces of the optical information recording medium at the same time. Therefore, an optical information recording device and optical information recording method capable of increasing the recording speed with the use of an optical beam can be realized.

Moreover, by using the interference of the optical beams, the recording marks can be at least formed at two or more positions on the optical information recording medium at the same time. Therefore, an optical information recording device and optical information recording method capable of increasing the recording speed with the use of an optical beam can be realized.

Furthermore, the recording marks can be at least reproduced from both surfaces of the optical information recording medium at the same time. Therefore, an optical information reproduction device and optical information reproduction method capable of increasing the reproducing speed with the use of an optical beam can be realized.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 11 is a schematic diagram illustrating the configuration of an optical disc device according to a second embodiment of the present invention (3);

DETAILED DESCRIPTION OF PREFERRED EMBODIMENTS

An embodiment of the present invention will be described in detail with reference to the accompanying drawings.

(1) First Embodiment

The following describes the configuration of an optical disc 100, or an optical information recording medium, according to a first embodiment of the present invention. How to record and reproduce information by using the optical disc 100 is also described below.

(1-1) Configuration of Optical Disc

Figure 1A:
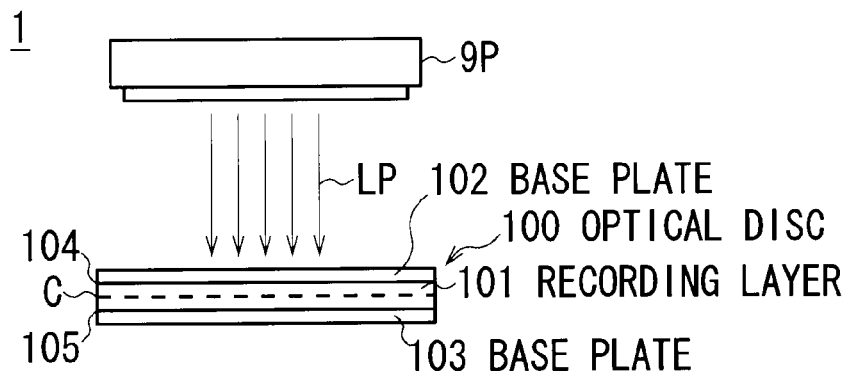
FIGS. 1A to 1C are schematic diagrams illustrating initialization of an optical information recording medium, and recording and reproducing of information according to a first embodiment of the present invention.

FIG. 1A is a side view of the optical disc 100. The optical disc 100 includes a flat recording layer 101 on which information are recorded. The recording layer 101 is sandwiched between a flat base plate 102 and a base plate 103. The optical disc 100 also includes reflection and transmission films 104 and 105 as positional reference layer: The reflection and transmission film 104 is positioned at a boundary between the base plate 102 and the recording layer 101 while the reflection and transmission film 105 is positioned at a boundary between the base plate 103 and the recording layer 101.

The recording layer 101 is made from photopolymerizable photopolymer, in which monomer is evenly dispersed. Accordingly, when being exposed to light, a portion of the recording layer 101 exposed to the light got polymerized (or photo-polymerized), and its refractive index changes. Alternatively, the recording layer 101's refractive index may change due to photocrosslinking, which is crosslinking between polymers as a result of being exposed to light: In this case, molecular weight increases.

In reality, the recording layer 101 is partly or mostly made from photopolymerizable, photocrosslinkable resin, which is for example made from free-radical-photopolymerizable compounds and a photopolymerization initiator, or cationic polymerizable compounds and a cationic photopolymerization initiator. Out of these photopolymerizable resins, photocrosslinkable resins and photopolymerization initiators, specifically, the photopolymerization initiators are appropriately selected to make photopolymerization occur at desired wavelengths.

The base plates 102 and 103 transmit enough optical beams of wavelengths that promote the polymerization of monomers of the recording layer 101. The reflection and transmission films 104 and 105 (a first positional reference layer and a second positional reference layer) are designed to reflect the predetermined amount of optical beam and transmit the rest of it therethrough.

Moreover, the reflection and transmission films 104 and 105 include a pre-groove (or a guiding groove) for tracking servo. More specifically, spiral tracks are formed by lands and grooves in a similar way to that of BD-R (Recordable). The recording segments of the tracks are associated with serial-number addresses, making it possible to identify a track from the address to record or reproduce information therefrom.

Instead of the pre-groove, a pit or the like may be formed on the reflection and transmission films 104 and 105. Alternatively, the combination of the pre-groove, the pits and the like may be applied, as long as the addresses can be recognized by using an optical beam.

The following describes an optical disc device 1 recording information on the optical disc 100 and reproducing information from the optical disc 100.

(1-1-1) Initialization of Optical Disc

Before information is recorded on the optical disc 100, the entire optical disc 100 or part of it is initialized. In this case, as shown in FIG. 1A, the initialization (pre-curing) of the recording layer 101 is conducted by an initialization beam source 9p that emits an initialization optical beam Lp to one side of the optical disc 100.

At this time, on the recording layer 101, photopolymerization or photocrosslinking, or both of them (correctively referred to as "optical reaction", hereinafter) occur where the initialization optical beam Lp strikes. As a result of being exposed to the initialization optical beam, the refractive index changes due to the polymerization of monomers inside it.

Incidentally, since the polymerization or photocrosslinking, or both of them evenly occurs in an area of the recording layer 101 that was exposed to the initialization optical beam Lp, this area's refractive index is leveled. That is, in the optical disc 100, if a symbol of "0" or "1" is going to be determined by the intensity of the reflection of the optical beam from the optical disc 100, only symbols of "0" (or "1") are recorded over the area of the initialized optical disc 100, meaning no information are recorded on the optical disc 100. In this manner, the optical disc device 1 pre-formats the optical disc 100.

Instead of using the initialization beam source 2 that is designed to expose the target area of the optical disc 100 to the initialization optical beam Lp at once, a small initialization beam source that just exposes a small area to the initialization optical beam Lp at one time may be used: It may be only initialize part of the optical disc 100, or it may move around to initialize the entire recording layer 101.

(1-1-2) Information Recording

Figure 1B:
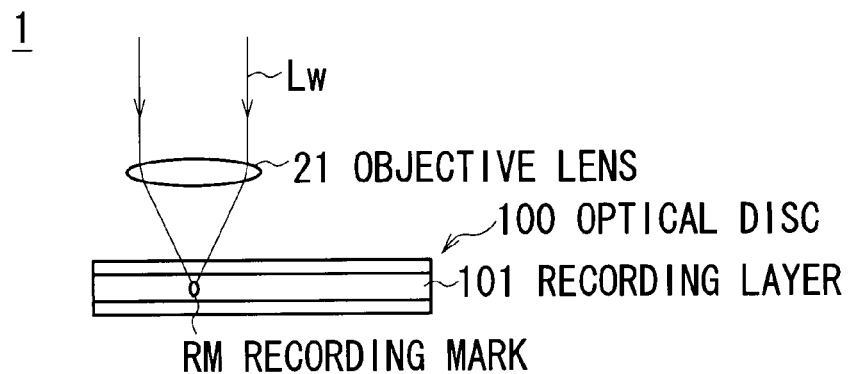

As shown in FIG. 1B, when recording information on the optical disc 100, the optical disc device 1 focuses a recording optical beam Lw on in the recording layer 101. In this case, the optical disc device 1 controls the position of the objective lens 21 to focus the recording optical beam Lw on a target position in the recording layer 101.

At this time, at the target position inside the recording layer 101, temperature rises locally due to the collected recording optical beam Lw and photopolymer changes in quality. This change of quality is believed to be caused by the increase of temperature and its exposure to the recording optical beam Lw.

It is also believed that, in the optical disc 100, organometallic or inorganic metallic compounds have chemically changed by the initialization optical beam Lp or the recording optical beam Lw and become metallic compounds or pure metal, and these metallic compounds or pure metal would separated out and aggregated due to the increase of temperature when the beam is focused.

In any case, in the optical disc 100, the area having the separated-out metallic compounds or pure metal has a relatively higher reflectance than the surrounding. As a result, around the target position of the recording layer 101, a volume-type recording mark RM is formed as a result of the change of photopolymer in quality.

In reality, the optical disc device 1 records the recording mark RM when a value of binarized data is "1". Whereas when a value of binarized data is "0", the optical disc device 1 does not record the recording mark RM. In this manner, the optical disc device 1 records information on the optical disc 100.

(1-1-3) Information Reproducing

Figure 1C:
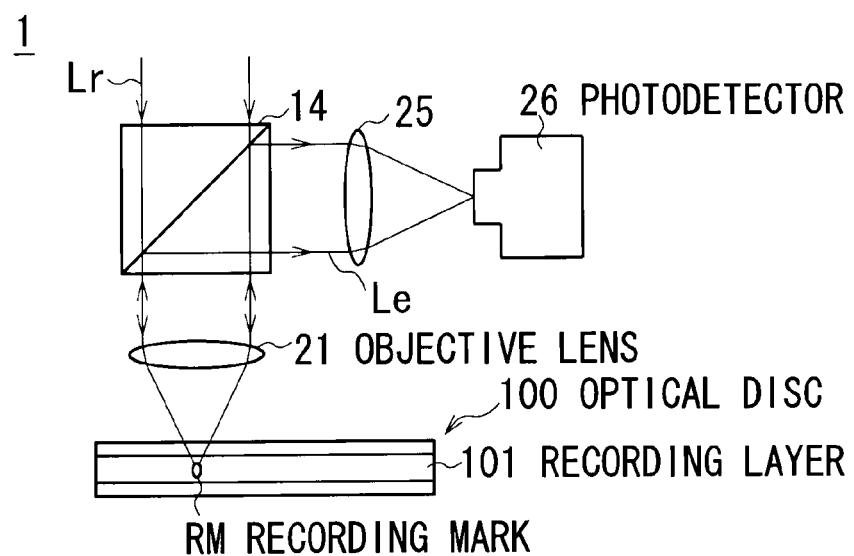

When reproducing information from the optical disc 100, the optical disc device 1 focuses a readout optical beam Lr on in the recording layer 101, as shown in FIG. 1C. In this case, in a similar way to when recording information, the optical disc device 1 controls the position of the objective lens 21 to focus the readout optical beam Lr on the target position inside the recording layer 101.

When receiving the reflection of the optical beam, or a returning optical beam Le (also referred to as "reproduction beam"), from the optical disc 100, a photodetector 26 of the optical disc device 1 detects the returning optical beam Le that has passed through the objective lens 21, a beam splitter 14, a collection lens 25 and the like.

The photodetector 26 transforms the returning optical beam Le to electronic signals, and produces receiving-beam signals according to the intensity of the returning optical beam L2.

For example, if there is not a recording mark RM at the target position of the optical disc 100 (i.e. the target position remains unchanged after initialization), the photodetector 26 detects the subtle returning optical beam Le. Therefore, the optical disc device 1 recognizes that no recording mark RM is recorded there, or a symbol of "0".

On the other hand, if there is a recording mark RM at the target position of the optical disc 100, the photodetector 26 detects the strong, bright returning optical beam Le. Therefore, the optical disc device 1 recognizes that a recording mark RM is recorded there, or a symbol of "1".

In that manner, the optical disc device 1 emits the recording optical beam Lw according to information, which should be recorded, and focuses it on the target position inside the recording layer 101 of the pre-initialized optical disc 100 to record the recording marks RM. Moreover, the optical disc device 1 emits the readout optical beam L2r, focuses it on the target position of the optical disc 100 and detects the returning optical beam Le from a portion where the recording mark RM is recorded to reproduce the information.

(1-2) Configuration of Optical Disc Device

Figure 2:
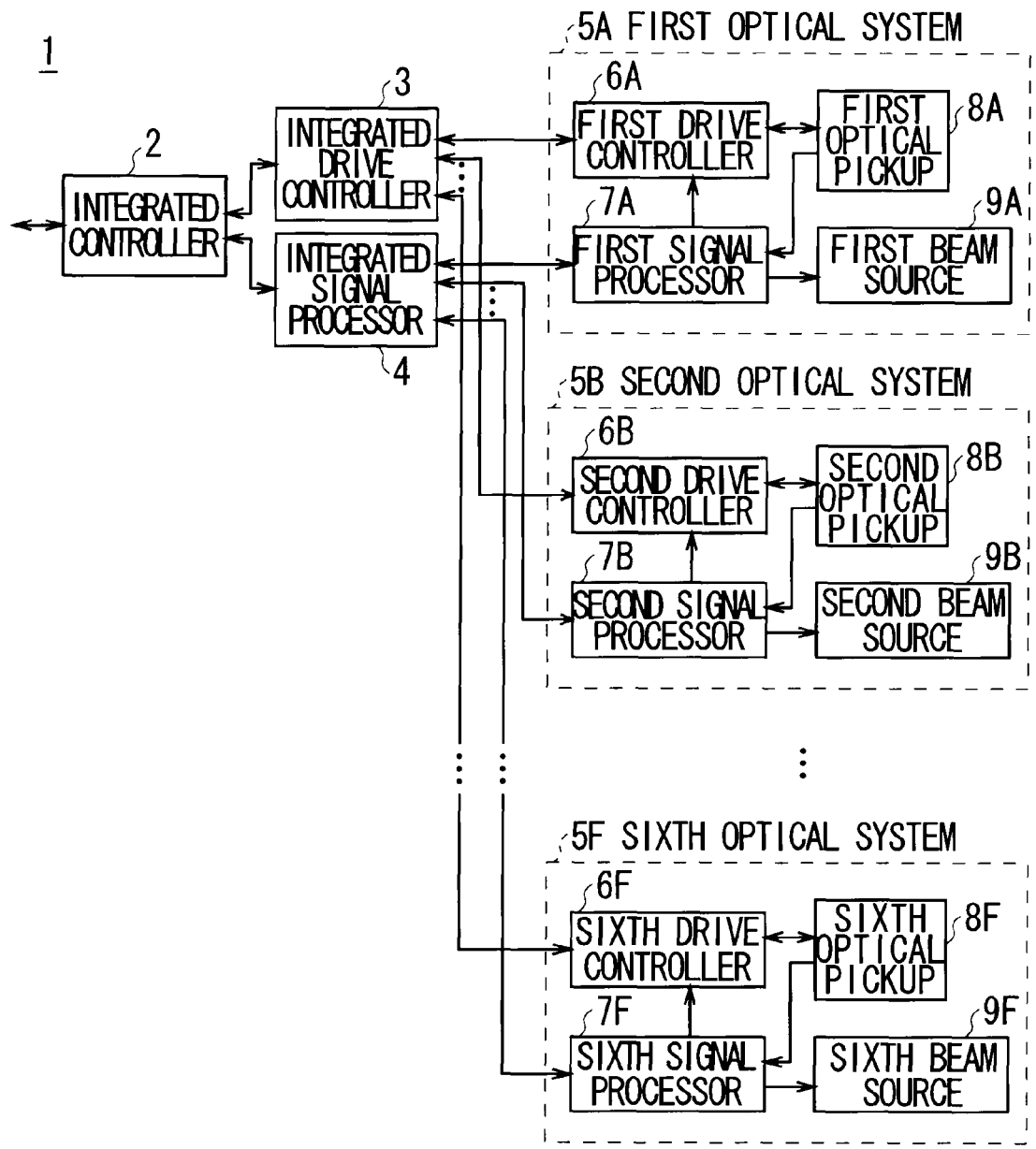
FIG. 2 is a schematic block diagram illustrating the circuit configuration of an optical disc device according to a first embodiment of the present invention.

As shown in FIG. 2, the optical disc device 1 includes an integrated controller 2 that takes overall control of the device 1 to record and reproduce information from the optical disc 100 (FIG. 1A).

The integrated controller 2 is designed to control six optical systems by using an integrated drive controller 3 and an integrated signal processor 4: a first optical system 5A, a second optical system 5B, a third optical system 5C, a fourth optical system 5D, a fifth optical system 5E and a sixth optical system 5F (which are also collectively referred to as "optical system 5").

The integrated drive controller 3 is designed to control first to sixth drive controllers 6A to 6F of the first to sixth optical systems 5A to 5F, according to an address of information which should be recorded on the optical disc 100 (FIG. 1A) and an address of information which should be reproduced from the optical disc 100.

The integrated signal processor 4 is designed to divide information, which should be recorded on the optical disc 100 (FIG. 1A), into six pieces and delivers them to first to sixth signal processors 7A to 7F of the first to sixth optical systems 5A to 5F. Moreover, the integrated signal processor 4 is designed to combine the pieces of information read out from the optical disc 100 by the first to sixth signal processors 7A to 7F of the first to sixth optical systems 5A to 5F.

By the way, the first to sixth optical systems 5A to 5F have the same structure. For ease of explanation, mainly the optical system 5A will be described hereinafter.

The first optical system 5A includes the first drive controller 6A, which is used for position control of an objective lens 21A (described later), and the first signal processor 7A, which performs various types of signal processing. In addition, the first optical system 5A includes an first optical pickup 8A, which is designed to move toward the innermost part or circumference of the optical disc 100, and a first beam source 9A, which supplies an optical beam to the first pickup 8A.

Figure 3:
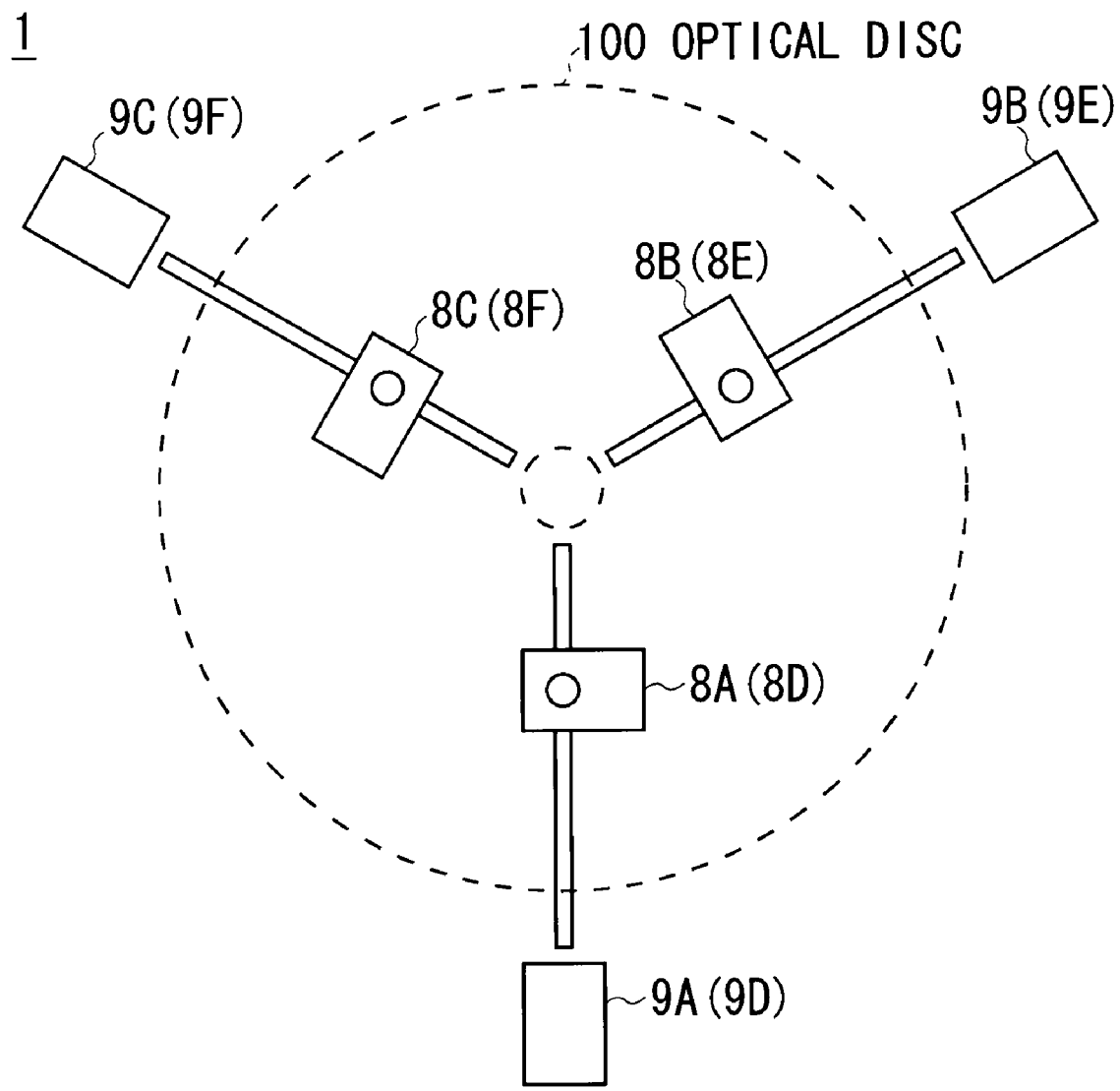
FIG. 3 is a schematic top view of an optical disc device according to a first embodiment of the present invention (1)

FIG. 3 is a top view of the optical disc 100 put in the optical disc device 1. The optical disc device 1 has three motion shafts along which the first to third optical pickups 8A, 8B and 8C (one-surface beam emission sections) move: These motion shafts are provided such that they face the undersurface of the optical disc 100, as if they are extending from the center of the optical disc 100 with an angle of 120 degrees between them. Accordingly, the optical disc device 1 can move the first optical pickup 8A, the second optical pickup 8B and third optical pickup 8C separately so that they move toward the innermost portion or the circumference (i.e. in the tracking direction).

The first beam source 9A is situated on the optical disc 1, away from the first optical pickup 8A. Regardless of wherever the first optical pickup 8A is, the first beam source 9A can supply the optical beam to the first optical pickup 8A via an optical path (not shown). The second and third beam sources 9B and 9C have the same structure.

Furthermore, the optical disc device 1 includes fourth to sixth optical pickups 8D, 8E and 8F (other-surface beam emission sections) which correspond to the first to third optical pickups 8A, 8B and 8C: The fourth to sixth optical pickups 8D, 8E and 8F are provided such that they face the upper surface of the optical disc 100 and can move in the tracking section.

Moreover, the fourth to sixth beam sources 9D, 9E and 9F are provided such that they can supply the optical beam to the fourth to sixth optical pickups 8D, 8E and 8F.

Figure 4:
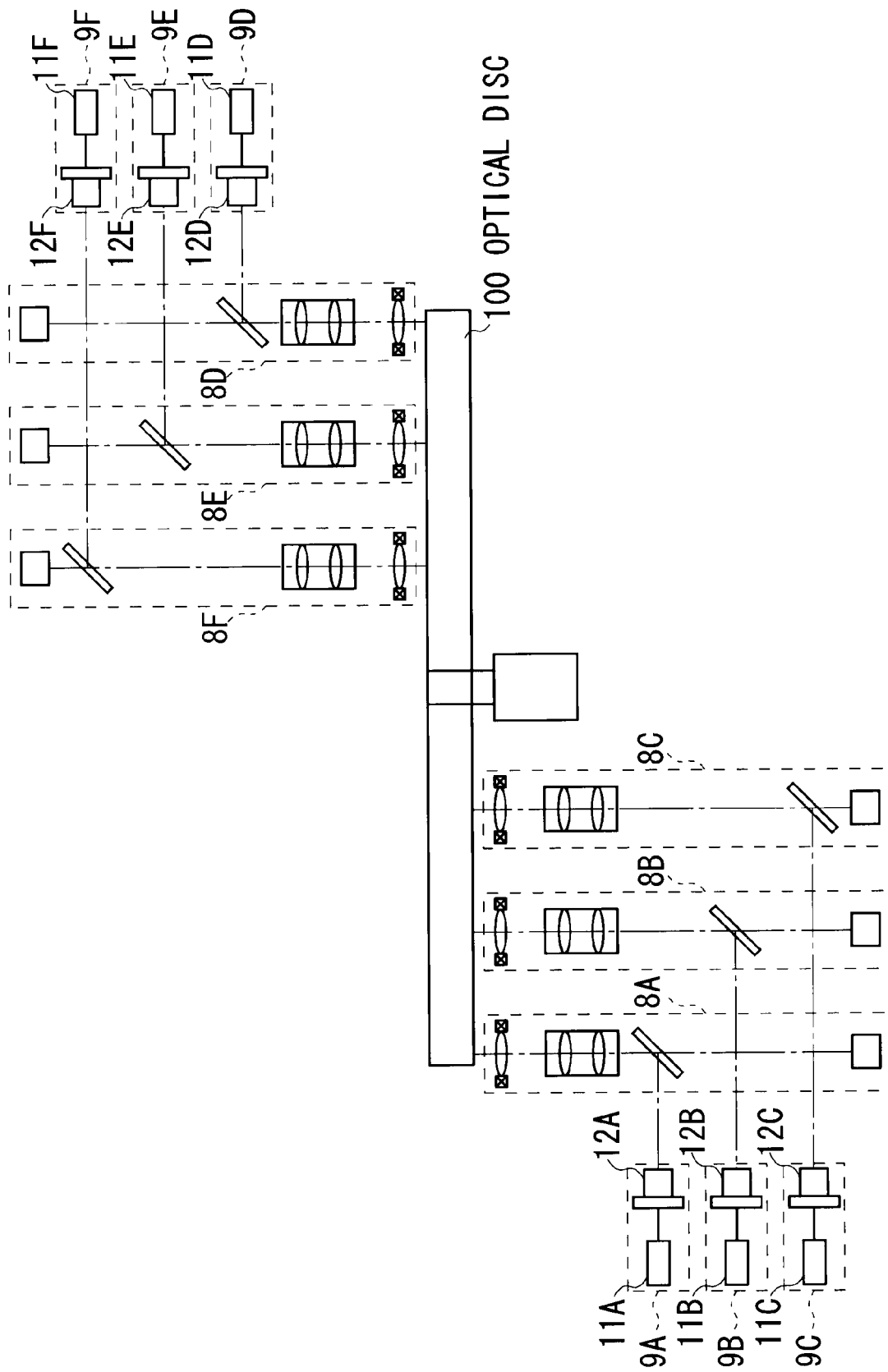
FIG. 4 is a schematic diagram illustrating the configuration of an optical disc device according to a first embodiment of the present invention (2)

FIG. 4 is a schematic diagram illustrating the optical paths of the first to sixth optical pickups 8A to 8F and the first beam source 9A to the sixth beam source 9F in the optical disc device 1. In the optical disc device 1 of the first embodiment, each optical system (the first to sixth optical system 5A to 5F) has its own beam source (the first to sixth beam source 9A to 9F).

The following describes the optical system 5 by using the first optical system 5A as its example. According to an emission signal supplied from the first signal processor 7A (FIG. 2), the beam source 9A of the first optical system 5A (FIG. 4) emits an optical beam L1A with a wavelength of 405 nm from a laser diode 12A via a laser drive circuit 11A. A collimator lens (not shown) converts it into collimated beam, which is then led to the optical pickup 8A.

Figure 5:
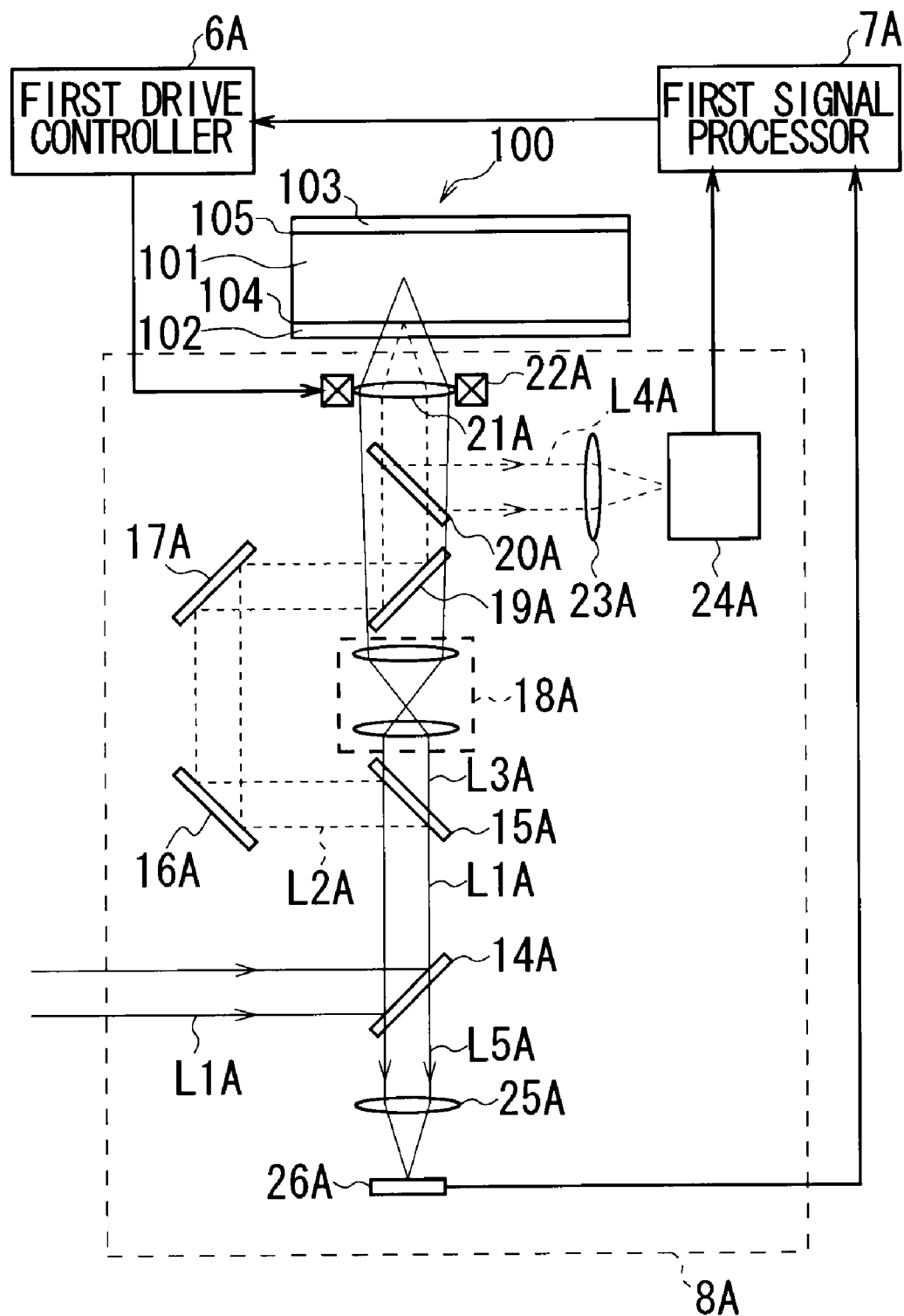
FIG. 5 is a schematic diagram illustrating the configuration of an optical pickup according to a first embodiment of the present invention.

As shown in FIG. 5, a beam splitter 14A of the optical pickup 8A partially reflects the optical beam L1A and leads it to a beam splitter 15A.

The beam splitter 15A reflects a predetermined amount of the optical beam L1A to produce a position control optical beam L2A, which is then reflected by a mirror 16A and a mirror 17A before entering a beam splitter 19A. The beam splitter 19A reflects a predetermined amount of the position control optical beam L2A, which is then transmitted through a beam splitter 20A before entering the objective lens 21A.

The objective lens 21A collects the position control optical beam L2A and emits it to the optical disc 100. At this time, the position control optical beam L2A is reflected by the reflection and transmission film 104 and becomes a position control reflection optical beam L4A, which then enters the objective lens 21A.

After that, the position control optical beam L4A is reflected by the beam splitter 20A. Subsequently, the position control optical beam L4A is collected by a collection lens 23A before being projected onto a photodetector 24A.

The photodetector 24A has a plurality of detection areas arranged in a predetermined pattern. The detection areas generate receiving-beam signals based on the result of receiving the beam, and then supply them to the first signal processor 7A.

The first signal processor 7A performs a predetermined arithmetic process to the receiving-beam signals, generates a focus error signal and tracking error signal, which represent a distance from a target track on the reflection and transmission layer 104 to the focal point of the positional control optical beam L2A, and supplies them to the first drive controller 6A.

Based on the focus error signal and the tracking error signal, the first drive controller 6A generates a drive signal, which is used for driving the objective lens 21A, and supplies it to an actuator 22A, which then drives the objective lens 21A in the focus and tracking direction.

In that manner, the first optical system 5A can perform a focus control process, by which the position control optical beam L2A is focused on the reflection and transmission film 104, and a tracking control process, by which the focal point of the position control optical beam L2A is aligned with a target track.

On the other hand, the beam splitter 15A partially transmits the optical beam L1A therethrough to produce a recording and reproducing optical beam L3A and leads it to a relay lens 18A. The relay lens 18A converts the recording and reproducing optical beam L3A into divergent light with a predetermined angle of divergence, which is then transmitted through the beam splitters 19A and 20A before entering the objective lens 21A.

Incidentally, the relay lens 18 is a combination of a plurality of lenses. For example, the relay lens 18 moves one of the lenses toward the optical axis of the recording and reproducing optical beam L3A to adjust the angle of divergence. In addition, the relay lens 18 is able to correct the spherical aberration or the like related to the recording and reproducing optical beam L3A.

The objective lens 21 focuses the recording and reproducing optical beam L3A on behind the reflection and transmission layer 104 inside the recording layer 101. At this time, in the first optical system 5A, the focal point of the recording and reproducing optical beam L3A is positioned just behind the target track. Furthermore, by controlling the relay lens 18A, the first optical system 5A can arbitrarily adjust the distance (also referred to as "depth") from the reflection and transmission layer 104 to the focal point of the recording and reproducing optical beam L3A.

As a result, the first optical system 5A can put the focal point of the recording and reproducing optical beam L3A just behind the target track such that it is positioned at a target depth, or a target position.

Here, to record information on the optical disc 100, the first optical system 5A increases the intensity of the optical beam L1A emitted from the laser diode 12 of the beam source 9A. As a result, the recording mark RM is produced at the target position, as shown in FIG. 1B.

Moreover, when reproducing information form the optical disc 100, the first optical system 5A weakens the intensity of the optical beam L1A emitted from the laser diode 12A of the beam source 9A. When there is a recording mark RM at the target position, the reflection of the optical beam (also referred to as "returning optical beam L5A") from the optical disc 100 is strong, as illustrated in FIG. 1C.

At this time, the returning optical beam L5A passes through the beam splitters 20A and 19A. And the returning optical beam L5A is converted by the combination of the objective lens 21A and the relay lens 18A into collimated beam, which then passes through the beam splitters 15A and 14A. Subsequently, the returning optical beam L5A is collected by the collection lens 25A before being projected onto the photodetector 26A.

On the other hand, if there is no recording mark RM at the target position, the reflection of the optical beam, or the returning optical beam L5A, is subtle.

The photodetector 26A receives the returning optical beam L5A. Based on the result of receiving the beam, the photodetector 26A generates receiving-beam signals according to the intensity of the returning optical beam L5A, and then supplies them to the first signal processor 7A. The first signal processor 7A performs predetermined processes, such as demodulation, to the receiving-beam signals, and produces reproduced signals, which are then supplied to the integrated signal processor 4 (FIG. 2).

At this time, the integrated signal processor 4 receives reproduced signals from each signal processor 7 (the first to sixth signal processors 7A to 7F) and combines them to produce final reproduced signals.

By the way, in the optical disc device 1, the target position for the first to third optical systems 5A to 5C that are designed to emit the optical beams to the undersurface of the optical disc 100 (i.e. to the base plate 102) is positioned above a imaginary center plane C of the recording layer 101 (indicated by dotted lines in FIG. 1) to be close to the base plate 102. The target position for the fourth to sixth optical systems 5D to 5F that are designed to emit the optical beams to the base plate 103 of the optical disc 100 is positioned below the imaginary center plane C of the recording layer 101 to be close to the base plate 103.

Therefore, the optical disc device 1 can shorten the distance (or depth) between the target position and the reflection and transmission film 104 or 105. Even if the reflection and transmission film 104 or 105 is not flat enough or the like, a mark recording layer, on which recording marks RM are formed, can be flattened as much as possible.

In that manner, the optical disc device 1 divides the information, which should be recorded, into six pieces, each of which is recorded by a different optical system (the first to sixth optical systems 5A to 5F) on the optical disc 100 at the same time. In addition, the information are read out and reproduced from the optical disc 100 by those six systems at the same time.

(1-3) Operation and Effect

With the above configuration, when recording information on the optical disc 100, the optical disc device 1 of the first embodiment divides the information, which should be recorded, into six pieces and delivers them to the first to sixth optical systems 5A and 5F. Each of the first to sixth optical systems 5A and 5F records the piece of information on its own target position in the recording layer 101 of the optical disc 100 at the same time.

When reproducing information from the optical disc 100, the optical disc device 1 controls the first to sixth optical systems 5A and 5F to read out the pieces of information from the corresponding target positions at the same time, and then combines them to produce final reproduced signals.

Accordingly, compared to a typical optical disc that uses only one optical system to record and reproduce information from one target position, the recording and reproducing speed of the optical disc device 1 is fast. Accordingly, it improves its transfer rates.

Here, the optical disc device 1 does not have to improve the transfer rate of each optical system 5. This means that it does not have to try to shorten the time required to form the recording mark RM (which is determined by the material of the recording layer 101 of the optical disc 100, the physicality and reaction rate of the material and the like); it does not have to try to increase the rotation speed of the optical disc 100; and it does not have to try to speed up modulation of the recording and reproducing optical beam L3A.

Especially, in the optical disc device 1, each optical system 5A, 5B, 5C, 5D, 5E and 5F has its own beam source 9A, 9B, 9C, 9D, 9E and 9F. Therefore, according to the pieces of information that should be recorded, each beam source changes the intensity of the beam it emits. Thus, the first to sixth optical systems 5A to 5F can write different pieces of information at the same time.

Accordingly, compared to one that has a plurality of optical systems but has only one beam source for the optical systems, the recording speed of the optical disc 1 is fast.

Moreover, the first to sixth optical pickups 8A to 8F are arranged so that the optical disc device 1 can move the first to sixth optical pickups 8A to 8F separately in the tracking direction (FIG. 3). Accordingly, the optical pickups are not affected by each other in terms of their recording positions during a recording and reproducing process.

In this case, the information supplied from the outside, or the information that should be recorded, are not divided and delivered to each optical system 5 by an external computer or the like: The information are divided and delivered to each optical system 5 by the integrated controller 2 and the like of the optical disc device 1. Moreover, when reproducing information, the integrated controller 2 and the like of the optical disc device 1 does not have to divide or deliver. What the external computers and the like should do is just supplying the information to the optical disc device 1 or receiving the information from the optical disc device 1, like a typical optical disc device.

According to the above configuration, when recording information on the recording layer 101 of the optical disc 100, the optical disc device 1 of the first embodiment divides the information, which should be recorded, into six pieces and delivers them to the first to sixth optical systems 5A and 5F, which then record the pieces of information at the same time. When reproducing information from the recording layer 101 of the optical disc 100, the optical disc device 1 controls the first to sixth optical systems 5A and 5F to read out the pieces of information from the corresponding target positions at the same time, and then combines them to produce reproduced signals. Accordingly, the recording and reproducing speeds of information increase as a whole.

Figure 6A:
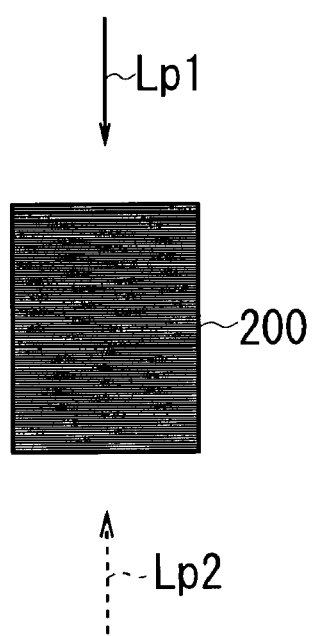
FIGS. 6A to 6C are schematic diagrams illustrating the basic concept of how to record and reproduce information according to a second embodiment of the present invention.

(2) Second Embodiment (2-1) Basic Concept for Recording and Reproducing Information A second embodiment of the present invention is different from the first embodiment. Information are recorded and reproduced from an optical disc 200, as shown in FIG. 6A.

The optical disc 200 is partly similar to the optical disc 100 (FIG. 1A). A recording layer 201 is sandwiched between a base plate 202 and a base plate 203. In addition, there is a reflection and transmission film 204 at a boundary between the recording layer 201 and the base plate 202. But there is no reflection and transmission film at a boundary between the recording layer 201 and the base plate 203.

The recording layer 201 is made from photopolymer or the like: It reacts to a blue optical beam with a wavelength of 405 nm, for example, and its refractive index changes according to the intensity of the beam.

In reality, the recording layer 201 of the optical disc 200 is previously formatted. The entire undersurface and uppersurface of the recording layer 201 are exposed to the optical beams Lp1 and Lp2 with a wavelength of 405 nm. As a result, a volume-type hologram is evenly produced over the recording layer 201.

Figure 6B:
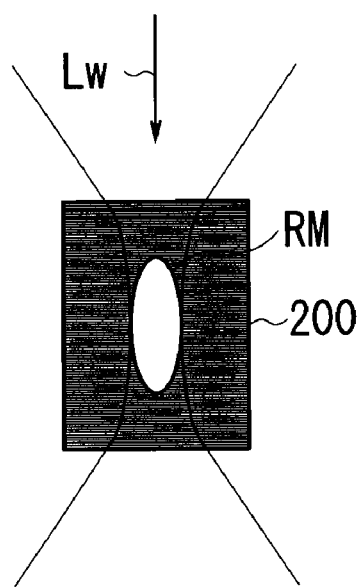

When the predetermined intensity of the recording optical beam Lw with a wavelength of 405 nm is for example focused on the recording layer 201, the hologram is broken around the focal point of the recording optical beam Lw, and the broken hologram becomes a recording mark RM as shown in FIG. 6B.

Figure 6C:
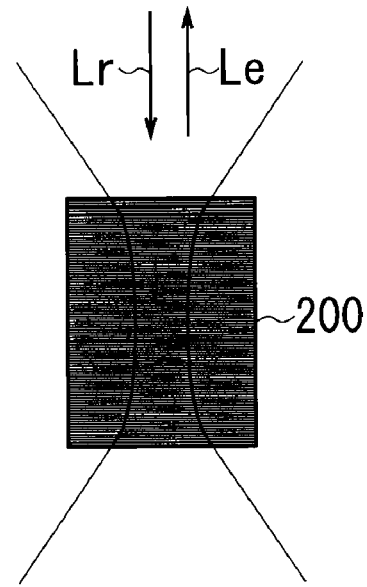

As a result, as shown in FIG. 6C, when an recording layer 201's other area where no recording mark RM is recorded is exposed to a readout optical beam Lr whose wavelength is the same as the optical beam used for formatting, it cause a reproduction optical beam Le due to its characteristics as a hologram.

On the other hand, when the area where the recording mark RM is recorded is exposed to the readout optical beam Lr, it does not cause the reproduction optical beam Le because it is not a hologram.

For example, to record and reproduce information from the recording layer 201, it is defined that an area having no recording mark RM (where the hologram remains untouched) means a value of "0" for binarized information while an area having a recording mark RM (where the hologram has been broken) means a value of "1".

In that manner, in the second embodiment, the recording layer 201 of the optical disc 200 is previously formatted and the hologram is evenly produced over the recording layer 201. And a predetermined optical beam, or the recording optical beam Lw, is emitted to record information while another optical beam, or the readout optical beam Lr is emitted to reproduce information.

On the other hand, in a similar way to that of the reflection and transmission film 104 of the optical disc 100, tracks are formed on the reflection and transmission film 204: They are used to identify the position on the optical disc 200.

Moreover, the reflection and transmission film 204 is made from a dichroic film having wavelength selectivity: This is something the reflection and transmission film 104 of the optical disc 100 does not have. The reflectance and transmission rate of the reflection and transmission film 204 vary according to the wavelength of the beam: It for example transmits almost 100 percent of the optical beam with a wavelength of 405 nm while reflecting almost 100 percent of the optical beam with a wavelength of 660 nm.

(2-2) Configuration of Optical Disc Device

Figure 7:
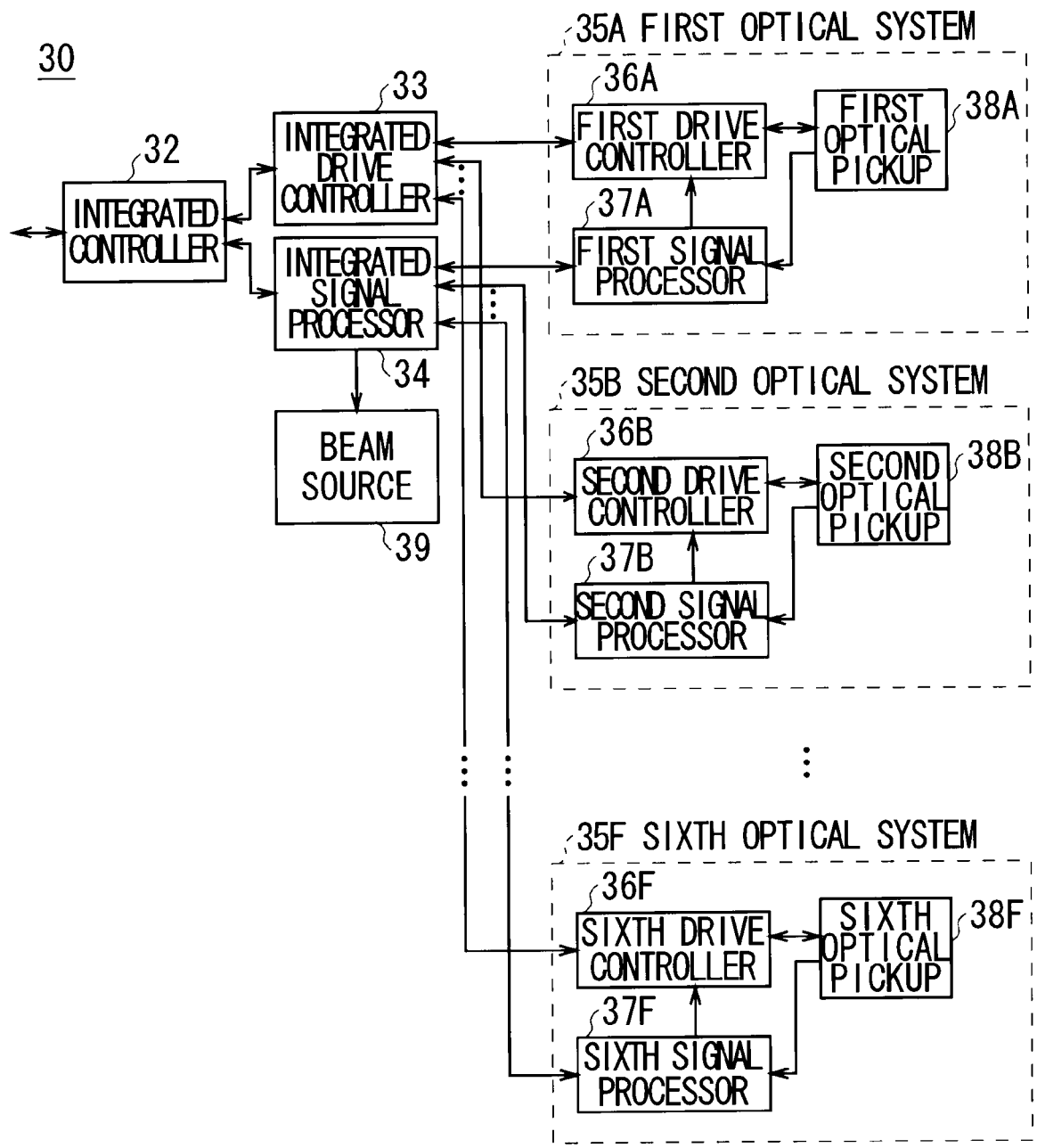
FIG. 7 is a schematic block diagram illustrating the circuit configuration of an optical disc device according to a second embodiment of the present invention.

As shown in FIG. 7 (which corresponds to FIG. 2), the optical disc device 30 of the second embodiment has an integrated controller 32, an integrated drive controller 33 and an integrated signal processor 34: They correspond to the integrated controller 2, the integrated drive controller 3 and the integrated signal processor 4, respectively.

Moreover, the optical disc device 30 includes first to sixth optical systems 35A to 35F, which correspond to the first to sixth optical system 5A to 5F, respectively. Compared to the first optical system 5A, the first optical system 35A of the optical disc device 30 does not have a beam source (or the first beam source 9A), while it includes a first drive controller 36A, a first signal processor 37A and a first optical pickup 38A, which are the equivalent of the first drive controller 6A, the first signal processor 7A and the first optical pickup 8A, respectively.

Figure 8:
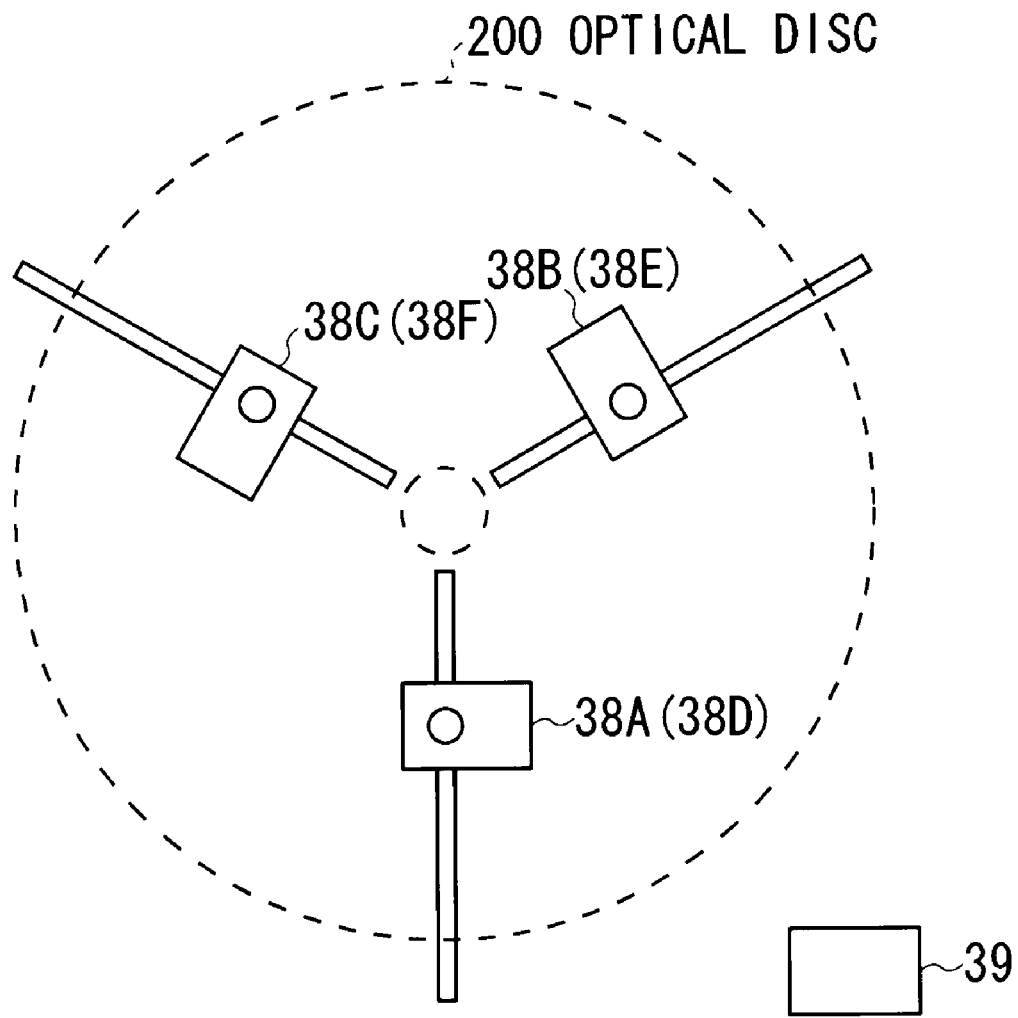
FIG. 8 is a schematic top view of an optical disc device according to a second embodiment of the present invention (1)

In reality, as shown in FIG. 8 (which corresponds to FIG. 3), the optical disc device 30 has only one beam source 39 as a whole: It does not have individual beam sources for each optical system. Incidentally, the optical disc device 30 has a distribution optical path (not shown) that supplies the optical beam emitted from the beam source 39 to each of first to sixth optical pickups 38A to 38F.

Figure 9:
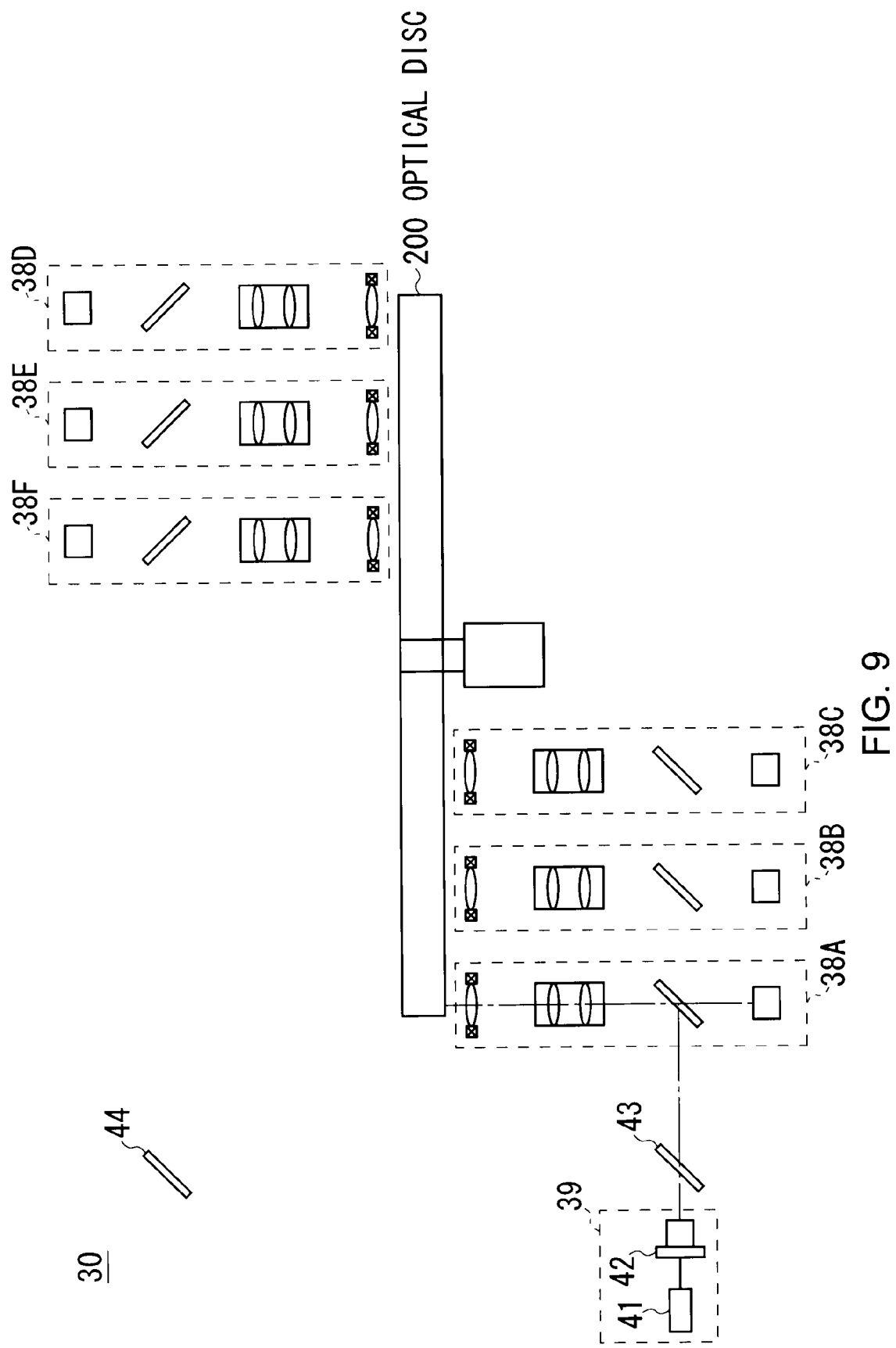
FIG. 9 is a schematic diagram illustrating the configuration of an optical disc device according to a second embodiment of the present invention (2)

In this manner, the optical disc device 30 only has one beam source 39. Accordingly, when recording information on the optical disc 200, the optical disc device 30 only uses the first optical pickup 38A of the first optical system 35A, as shown in FIG. 9 (which corresponds to FIG. 4).

(2-2-1) Information Recording

Figure 10:
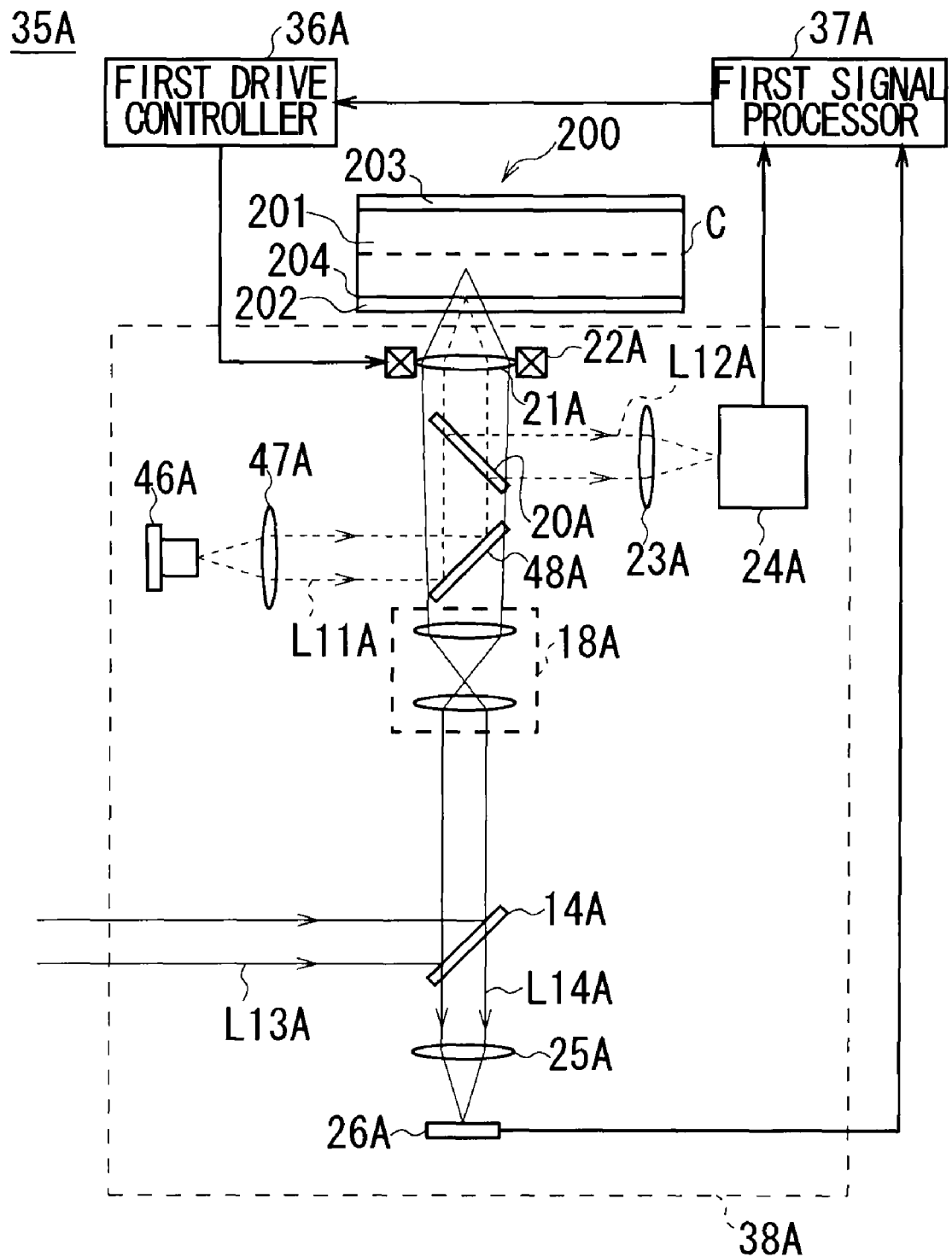
FIG. 10 is a schematic diagram illustrating the configuration of an optical pickup according to a second embodiment of the present invention.

With reference to FIG. 10 whose parts have been designated by the same symbols and marks as the corresponding parts of FIG. 5, the configuration of the optical system 35 will be described by using the first optical system 35A as an example. The first optical system 35A includes a laser diode 46A inside the first optical pickup 38A. The laser diode 46A emits a position control optical beam L11A with a wavelength of about 660 nm, which is then converted by a collimator lens 47 into collimated beam before entering a beam splitter 48A.

The beam splitter 48A has wavelength selectivity, which is the same kind as that of the reflection and transmission film 204. The beam splitter 48A reflects the position control optical beam L11A to the beam splitter 20A. The beam splitter 20 transmits the position control optical beam L11A therethrough and leads it to the objective lens 21A.

Subsequently, in a similar way to the position control optical beam L2A in the first optical pickup 8A of the first embodiment, the position control optical beam L11A in the first optical pickup 38A reaches the optical disc 200, and its reflection, or a position control reflection optical beam L12A, is projected onto the photodetector 24A, which then produces receiving-beam signals.

The first signal processor 37A generates a focus error signal and a tracking error signal from the receiving-beam signals supplied from the photodetector 24A, and supplies them to the first drive controller 36A. Based on the focus error signal and the tracking error signal, the first drive controller 36A controls the actuator 22A to move the objective lens 21A in the focus or tracking direction.

In that manner, in a similar way to the first optical system 5A (FIG. 5) of the first embodiment, the first optical system 35A can perform a focus control process, by which the position control optical beam L11A is focused on the reflection and transmission film 204, and a tracking control process, by which the focal point of the position control optical beam L11A is aligned with a target track.

On the other hand, based on an emission signal supplied from the integrated signal processor 34 (FIG. 7), the beam source 39A (FIG. 9) emits an optical beam L13 from a laser diode 42 via a laser drive circuit 41. A collimator lens (not shown) converts it into collimated beam, which is then led to the first optical pickup 38A as a recording and reproducing optical beam L13A after passing through a beam splitter 43.

The beam splitter 14A of the first optical pickup 38A (FIG. 10) partially reflects the recording and reproducing optical beam L13A and leads it to the relay lens 18A. The relay lens 18A converts the recording and reproducing optical beam L13A into divergent light with a predetermined angle of divergence, which is then transmitted through the beam splitters 19A and 20A before entering the objective lens 21A.

In a similar way to the first embodiment, the objective lens 21 focuses the divergent recording and reproducing optical beam L13A on a target position inside the recording layer 201.

When recording a piece of information with a value of "1" on the optical disc 200, the optical disc device 30 increases the intensity of the optical beam L11 emitted from the laser diode 42 of the beam source 39. This breaks the hologram around the target position to produce a recording mark RM, as illustrated in FIG. 6B.

When recording a piece of information with a value of "0" on the optical disc 200, the optical disc device 30 stops the emission of the recording and reproducing optical beam L13A from the laser diode 42 of the beam source 39. As a result, the hologram around the target position remains untouched, as illustrated in FIG. 6C.

(2-2-2) Information Reproducing

As shown in FIG. 11 (which corresponds to FIG. 9), when reproducing information from the optical disc 200, the laser diode 42 of the beam source 39 of the optical disc device 30 emits a recording and reproducing optical beam L13A, which is then led by the beam splitter 43, a mirror 44 and the like to the first to sixth optical pickups 38A to 38F of the first to sixth optical systems 35A to 35F.

Incidentally, the optical disc device 30 controls the laser drive circuit 41 to appropriately weaken the intensity of the optical beam L13 emitted from the laser diode 42 for reproducing information from the hologram.

At this time, in the first optical pickup 38A (FIG. 10), when there is no recording mark RM around the target position, the hologram around the target position causes a strong returning optical beam (also referred to as "returning optical beam L14A"), as illustrated in FIG. 6C.

The returning optical beam L14 is transmitted through the beam splitters 20A and 19A. After that, the returning optical beam L14 is converted by the combination of the objective lens 21A and the relay lens 18A into collimated beam, which is then transmitted through the beam splitters 15A and 14A. Subsequently, it is collected by the collection lens 25A and then projected onto the photodetector 26A.

On the other hand, when there is a recording mark RM around the target position, the broken hologram around the target position of the optical disc 200 does not cause the returning optical beam L14A.

The photodetector 26A receives the returning optical beam L14A. Based on the result of receiving the beam, the photodetector 26A produces receiving-beam signals according to the intensity of the returning optical beam L14A, and then supplies them to the first signal processor 37A. The first signal processor 37A performs predetermined processes, such as demodulation, to the receiving-beam signals, produces reproduced signals, and then supplies them to the integrated signal processor 34 (FIG. 7).

At this time, in a similar way to the integrated signal processor 4 of the first embodiment, the integrated signal processor 34 combines the reproduced signals supplied from each signal processor 37 (the first to sixth signal processors 37A to 37F) to produce final reproduced signals.

In that manner, the optical disc device 30 only uses the first optical system 35A to record information. When reproducing information, the optical disc device 30 uses the first to sixth optical systems 35A to 35F.

Incidentally, in a similar way to the reproduction method of the first embodiment, the optical disc device 30 reproduces information such that each optical system bears part of the reproduction process: The target positions are set to be closer to each optical system than is the imaginary center plane C of the recording layer 201 (FIG. 10). On the other hand, the first optical system 35A records the information on the entire area of the recording layer 201.

(2-3) Operation and Effect

With the above configuration, the optical disc device 30 of the second embodiment only uses the first optical system 35A to record information at the target position of the recording layer 201 of the optical disc 200.

On the other hand, the optical disc device 30 uses the first to sixth optical systems 35A to 35F to read out the pieces of information from the individual target positions at the same time, and then combines them to produce final reproduced signals.

Accordingly, compared to a typical optical disc device that uses only one optical system to record and reproduce information from one target position, the reproducing speed of the optical disc 30 becomes fast, while the recording speed remains the same.

Especially, since the optical disc device 30 only has one beam source 9, the number of optical components can be reduced and the structure can be simplified, compared to the optical disc device 1 of the first embodiment (FIG. 4).

Moreover, in the optical disc device 30, the position control optical beam L11A has a different wavelength from that of the recording and reproducing optical beam L13A. Accordingly, the optical disc device 30 can use not only a simple beam splitter (like those of the first embodiment) but also the beam splitter 48A and reflection and transmission film 204 having wavelength selectivity. This increases efficiency in use of the optical beams. Accordingly, in the optical disc device 30, the laser diodes 42 and 46A and the like do not have to emit the high-power optical beams. This could ease restrictions on conditions for designing and reduce power consumption.

According to the above configuration, the optical disc device 30 of the second embodiment only uses the first optical system 35A to record information. And the optical disc device 30 uses the first to sixth optical systems 35A to 35F to reproduce information from the recording layer 201 of the optical disc 200. The first to sixth optical systems 35A to 35F read out the pieces of information from the individual target positions at the same time, and the optical disc device 30 combines them to produces the reproduced signals. This could increase the reproducing speed of information while preventing the structure from getting complicated.

Figure 12A:
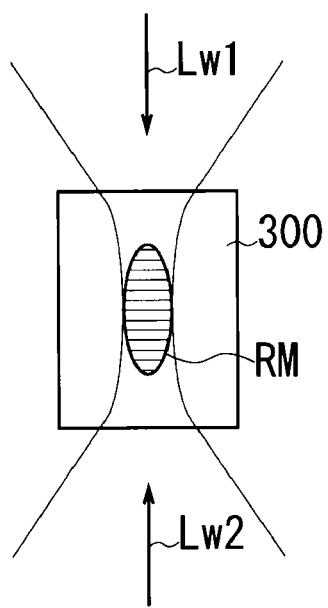
FIGS. 12A to 12C are schematic diagrams illustrating the basic concept of how to record and reproduce information according to a third embodiment of the present invention.

(3) Third Embodiment (3-1) Basic Concept for Recording and Reproducing Information A third embodiment of the present invention is different from the first and second embodiments. Information are recorded and reproduced from an optical disc 300, as shown in FIG. 12A.

The optical disc 300 is partly similar to the optical disc 100 (FIG. 1A) and the optical disc 200 (FIG. 6A). A recording layer 301 is sandwiched between a base plate 302 and a base plate 303. In addition, there is a reflection and transmission film 304 at a boundary between the recording layer 301 and the base plate 302.

The recording layer 301 is made from photopolymer or the like: It reacts to a blue optical beam with a wavelength of 405 nm, for example, and its refractive index changes according to the intensity of the beam.

When the upper surface and undersurface of the recording layer 301 are exposed to the predetermined intensity of coherent recording optical beams Lw1 and Lw2 with a wavelength of 405 nm, an interference pattern is caused by standing waves as a result of the interference between the recording optical beams L1w and L2w. A portion of the interference pattern that has been exposed to the high-power optical beam changes its refractive index. Therefore, it becomes a recording mark RM, or a hologram.

Figure 12B:
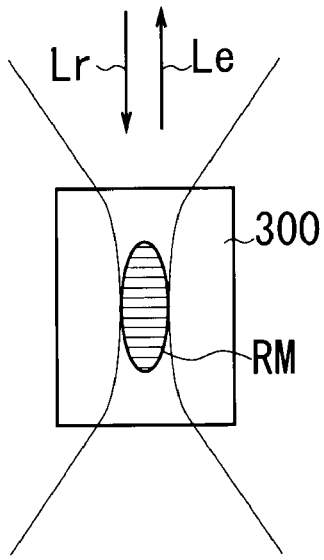

As shown in FIG. 12B, when the recording mark RM is exposed to a readout optical beam Lr whose wavelength is the same as the optical beam used for recording, it cause a reproduction optical beam Le due to its characteristics as a hologram.

Figure 12C:
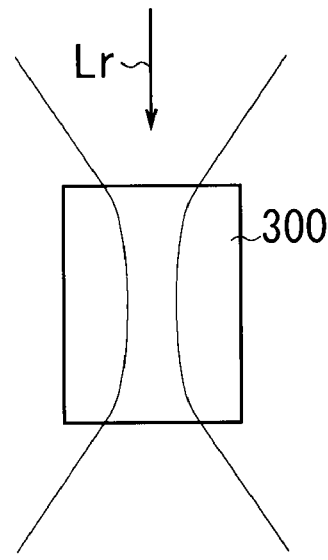

On the other hand, as shown in FIG. 12C, when an area where there is no recording mark RM recorded is exposed to the readout optical beam Lr, it does not cause the reproduction optical beam Le.

For example, to record and reproduce information from the recording layer 301, it is defined that an area having no recording mark RM means a value of "0" for binarized information while an area having a recording mark RM means a value of "1".

In that manner, according to the third embodiment, a hologram is produced to record information by using two optical beams, or the recording optical beams Lw1 and Lw2. Whereas only one optical beam, or the readout optical beam Lr, is used to reproduce information.

On the other hand, in a similar way to that of the reflection and transmission film 204 of the second embodiment, tracks are formed on the reflection and transmission film 304: They are used to identify the position on the optical disc 300. The reflection and transmission film 304 has wavelength selectivity.

(3-2) Configuration of Optical Disc Device

Figure 13:
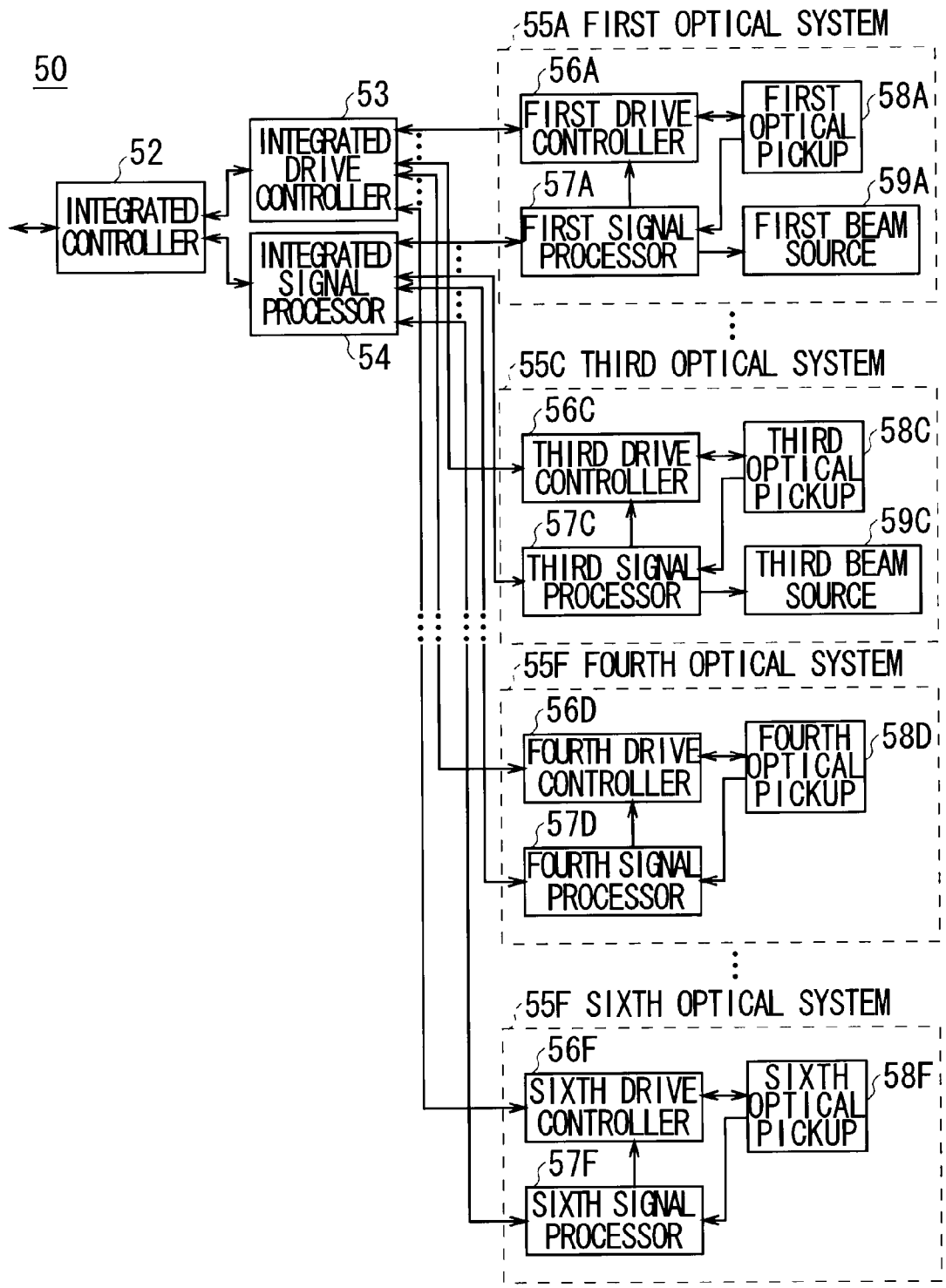
FIG. 13 is a schematic block diagram illustrating the circuit configuration of the optical disc device according to a third embodiment of the present invention.

As shown in FIG. 13 (which corresponds to FIGS. 2 and 7), the optical disc device 50 of the third embodiment has an integrated controller 52, an integrated drive controller 53 and an integrated signal processor 54: They correspond to the integrated controller 2, the integrated drive controller 3 and the integrated signal processor 4, respectively.

Moreover, the optical disc device 50 includes first to sixth optical systems 55A to 55F, which correspond to the first to sixth optical system 5A to 5F, respectively. Compared to the first optical system 5A of the optical disc device 1, the first optical system 55A of the optical disc device 50 includes a first drive controller 56A, a first signal processor 57A, a first optical pickup 58A and a first optical source 59A, which are the equivalent of the first drive controller 6A, the first signal processor 7A, the first optical pickup 8A and the first beam source 9A, respectively. The second and third optical systems 55B and 55C have a similar structure.

On the other hand, the fourth to sixth optical systems 55D to 55F do not have a beam source. But each of the fourth to sixth optical systems 55D to 55F has a drive controller 56, a signal processor 57 and an optical pickup 58.

Incidentally, the optical disc device 50 has a optical path (not shown) that supplies the optical beams emitted from the first, second and third beam sources 59A, 59B and 59C to the first optical pickup 58A and the second optical pickup 58B, the third optical pickup 58C and the fourth optical pickup 58D, and the fifth optical pickup 58E and the sixth optical pickup 58F, respectively.

(3-2-1) Information Recording

Figure 14:
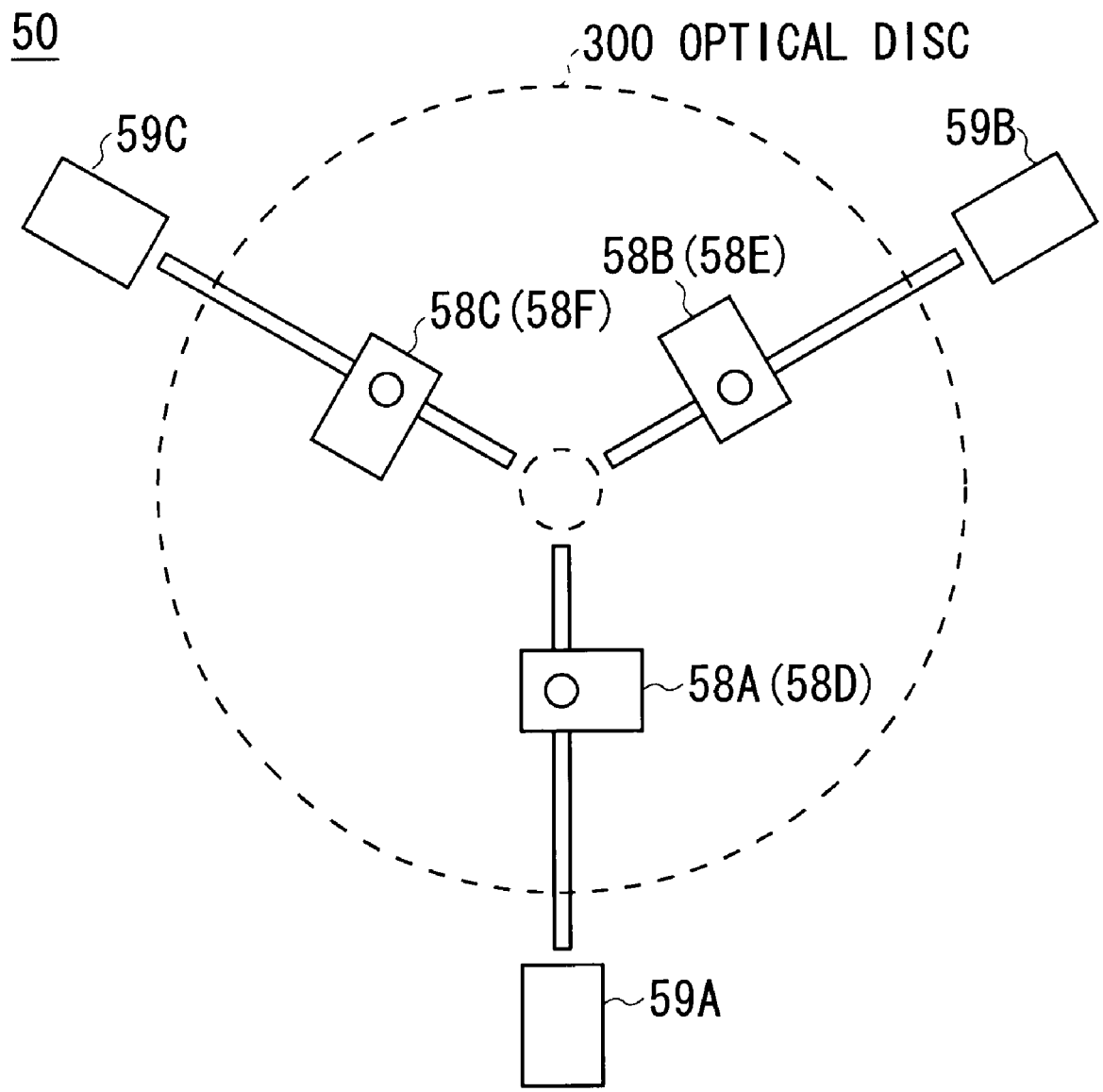
FIG. 14 is a schematic top view of an optical disc device according to a third embodiment of the present invention (1)

As show in FIG. 14 (which corresponds to FIG. 3), in the optical disc device 50, the optical beam emitted from the first beam source 59A is supplied to the first optical pickup 58A and the fourth optical pickup 58D; the optical beam emitted from the second beam source 59B is supplied to the second optical pickup 58B and the fifth optical pickup 58E; and the optical beam emitted from the third beam source 59C is supplied to the third optical pickup 58C and the sixth optical pickup 58F.

Figure 15:
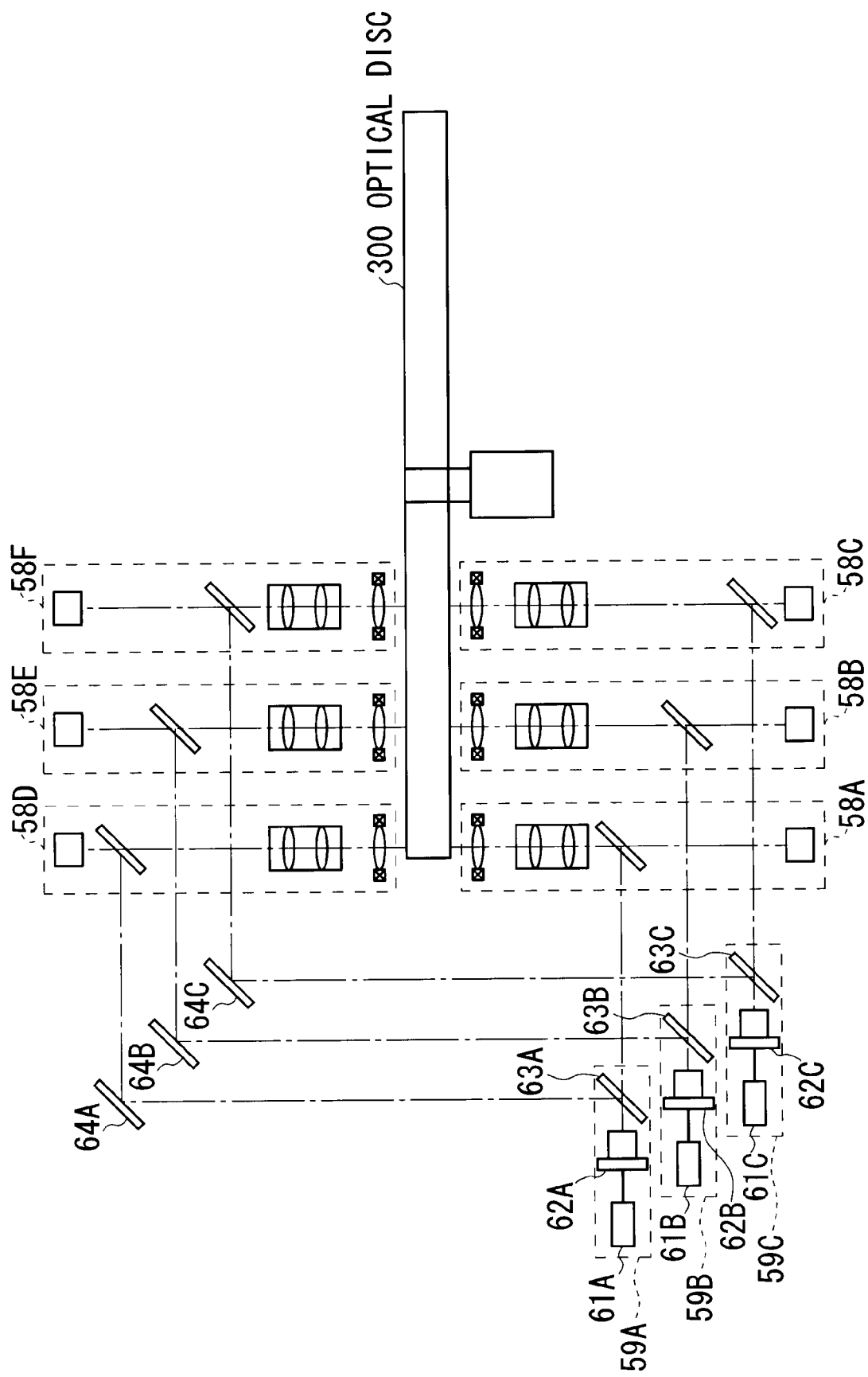
FIG. 15 is a schematic diagram illustrating the configuration of an optical disc device according to a third embodiment of the present invention (2)

In this manner, the optical disc device 50 has three beam sources (the first to third beam sources 59A to 59C). As shown in FIG. 15 (which corresponds to FIG. 4), when recording information on the optical disc 300, the optical disc device 50 uses a combination of the first and fourth optical systems 55A and 55D, a combination of the second and fifth optical systems 55B and 55E, and a combination of the third and sixth optical systems 55C and 55F to record information, which are divided into three pieces, at the same time.

Figure 16:
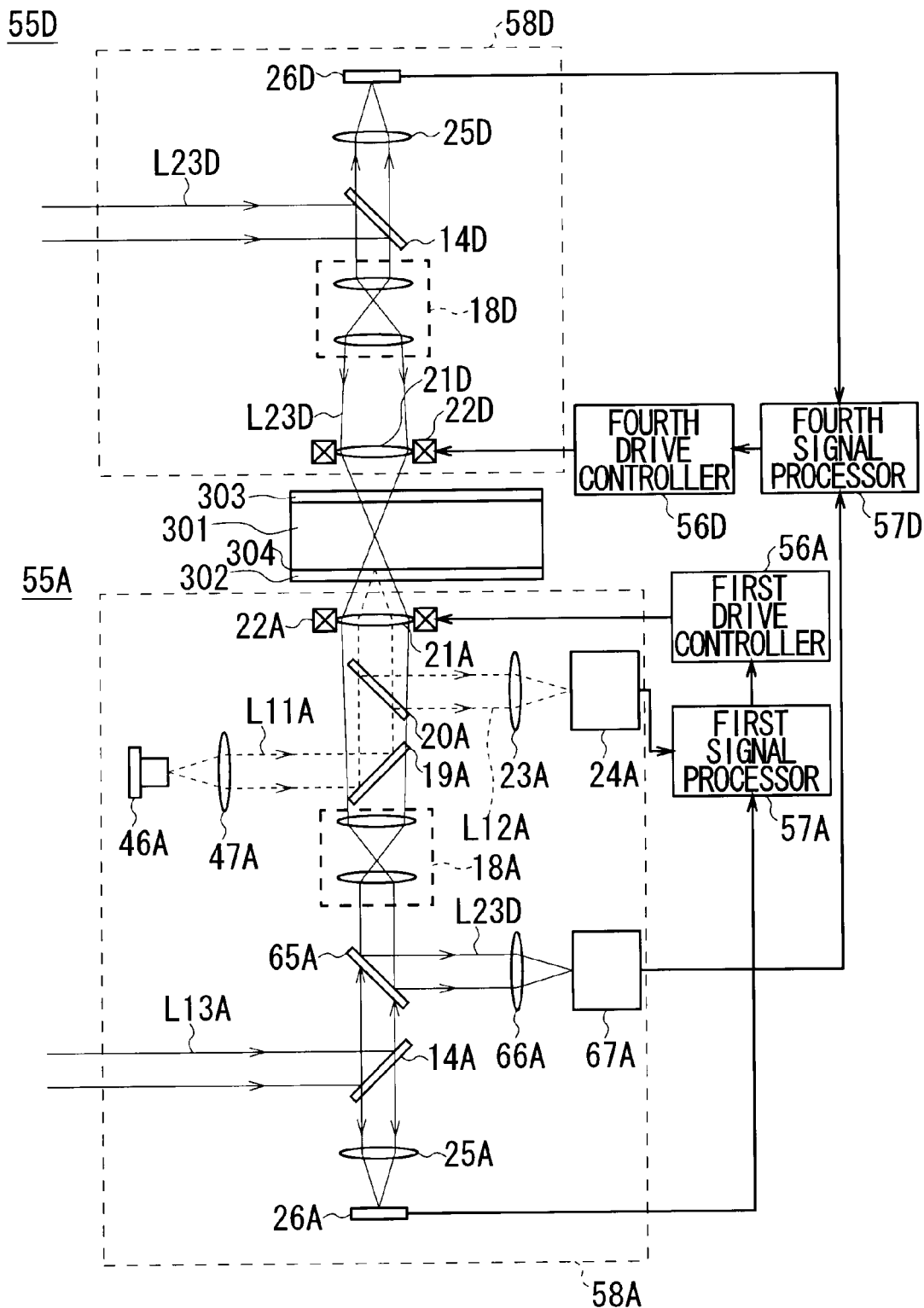
FIG. 16 is a schematic diagram illustrating the configuration of an optical pickup according to a third embodiment of the present invention.

With reference to FIG. 16 whose parts have been designated by the same symbols and marks as the corresponding parts of FIGS. 5 and 10, the configuration of the optical system 55 will be described by using the first and fourth optical systems 55A and 55D as an example. In a similar way to the first optical pickup 38A of the second embodiment (FIG. 10), the laser diode 46A of the first optical pickup 58A of the first optical system 55A emits a position control optical beam L11A. After receiving the reflection of the beam, or a position control reflection optical beam L12A, it performs a focus and tracking control process of the objective lens 21A according to the result of receiving the beam L12A.

The first optical system 55A emits an optical beam L21A from a laser diode 62A via a laser drive circuit 61 of the first beam source 59A. A collimator lens (not shown) converts it into collimated beam, which is then transmitted through a beam splitter 63. Subsequently, it is supplied to the first optical pickup 58A as a recording and reproducing optical beam L23A.

In a similar way to the first optical pickup 38A of the second embodiment (FIG. 10), the first optical pickup 58A focuses the recording and reproducing optical beam L23A on a target position inside the recording layer 301.

On the other hand, the beam splitter 14A of the optical pickup 58D reflects the recording and reproducing optical beam L23D, which was reflected by a beam splitter 63A and a mirror 64A, and leads it to a relay lens 18D. The relay lens 18D converts the recording and reproducing optical beam L23D into divergent light with a predetermined angle of divergence, which enters the objective lens 21D.

The objective lens 21D focuses the recording and reproducing optical beam L23D on in the recording layer 301, which then passes through the recording layer 301. Subsequently, the recording and reproducing optical beam L23D is converted by the objective lens 21A into convergent beam, and transmitted through the beam splitters 20A and 19A before entering a relay lens 18A.

The relay lens 18A converts the recording and reproducing optical beam L23D into collimated beam, which is then partially reflected by the beam splitter 65A. The recording and reproducing optical beam L23D is then collected by a collimator lens 66A before being projected onto a photodetector 67A.

Like the photodetector 24A, the photodetector 64A has a plurality of detection areas arranged in a predetermined pattern. The detection areas generate receiving-beam signals based on the result of receiving the beam, and then supply them to the fourth signal processor 57D.

The first signal processor 57D performs a predetermined arithmetic process to the receiving-beam signals, generates a focus error signal and tracking error signal, which represent a distance from the focal point of the recording and reproducing optical beam L23A to the focal point of the recording and reproducing optical beam L23D, and supplies them to the fourth drive controller 56D.

Based on the focus error signal and the tracking error signal, the fourth drive controller 56D generates a drive signal, and supplies it to an actuator 22D, which then drives the objective lens 21D in the focus and tracking direction.

In that manner, the fourth optical system 55D can control the position of the objective lens 21D so that the focal point of the recording and reproducing optical beam L23D is aligned with the focal point of the recording and reproducing optical beam L23A.

When recording a piece of information with a value of "1" on the optical disc 300, the optical disc device 50 increases the intensity of the optical beam L21 emitted from the laser diode 62A of the beam source 59A. And the optical disc device 50 focuses the recording and reproducing optical beam L23A and the recording and reproducing optical beam L23D on the target position and produces an interference pattern to create a recording mark RM as illustrated in FIG. 12A.

When recording a piece of information with a value of "0" on the optical disc 300, the optical disc device 50 stops the emission of the recording and reproducing optical beam L21A from the laser diode 62A of the beam source 59A. Accordingly, a hologram is not formed, as illustrated in FIG. 12C.

(3-2-2) Information Reproducing

Figure 17:
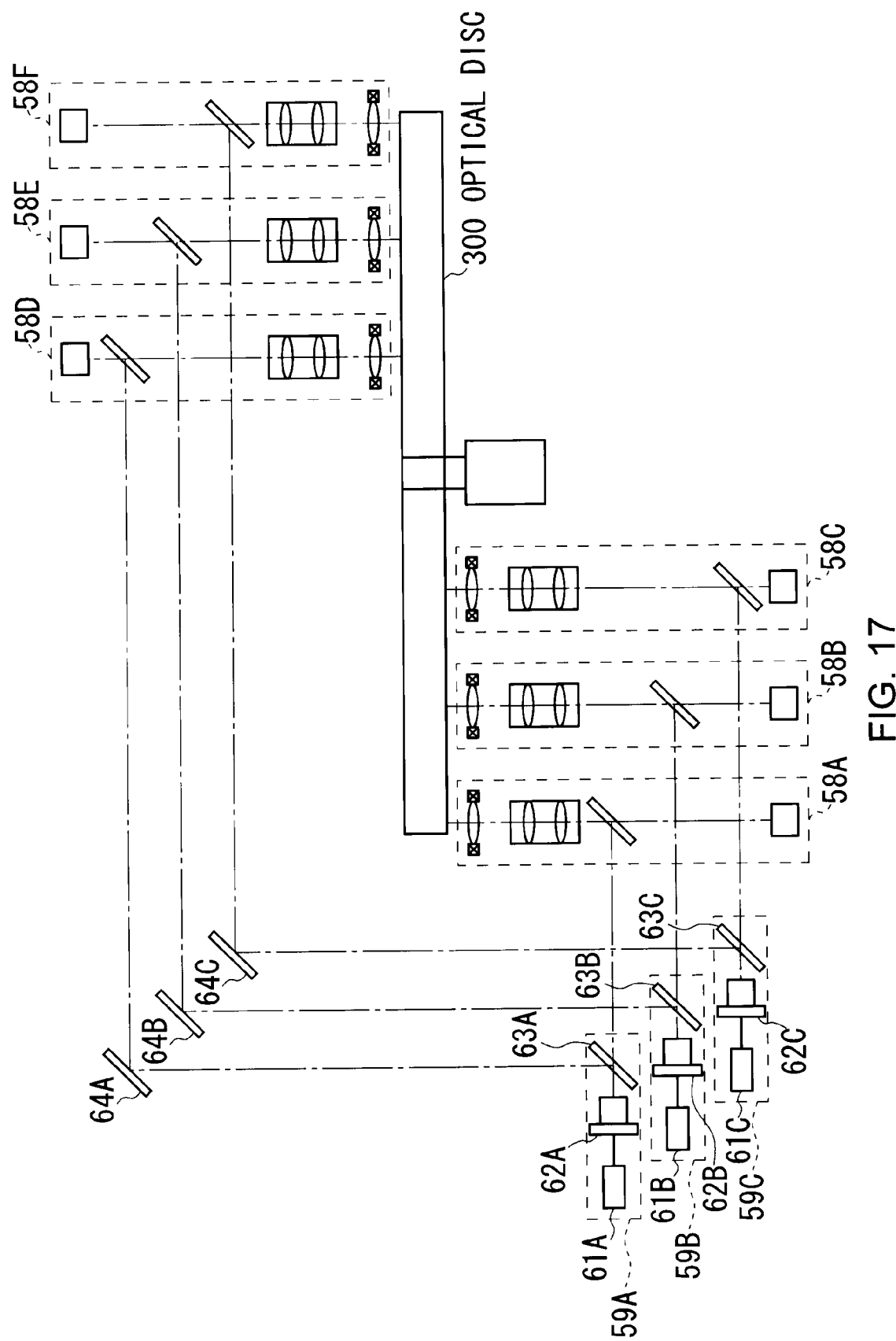
FIG. 17 is a schematic diagram illustrating the configuration of an optical disc device according to a third embodiment of the present invention (3)

When reproducing information from the optical disc 300, as shown in FIG. 17 (which corresponds to FIG. 15), the optical disc device 50 moves the first and fourth optical pickups 58A and 58D separately in the tracking direction.

Moreover, the first optical pickup 58A (FIG. 16) focuses the recording and reproducing optical beam L23A on a target position inside the recording layer 301 of the optical disc 300.

At this time, in the first optical pickup 58A, when there is a recording mark RM around the target position, the hologram around the target position causes a strong returning optical beam (also referred to as "returning optical beam L24A"), as illustrated in FIG. 12B.

The returning optical beam L24 is transmitted through the beam splitters 20A and 19A. After that, the returning optical beam L24 is converted by the combination of the objective lens 21A and the relay lens 18A into collimated beam, which is then transmitted through the beam splitters 15A and 14A. Subsequently, it is collected by the collection lens 25A and then projected onto the photodetector 26A.

On the other hand, when there is no recording mark RM around the target position, the target position of the optical disc 300 does not cause the returning optical beam L24A, because there is no hologram around the target position.

The photodetector 26A receives the returning optical beam L24A. Based on the result of receiving the beam, the photodetector 26A produces receiving-beam signals according to the intensity of the returning optical beam L24A, and then supplies them to the first signal processor 57A. The first signal processor 57A performs predetermined processes, such as demodulation, to the receiving-beam signals, produces reproduced signals, and then supplies them to the integrated signal processor 54 (FIG. 13).

At this time, in a similar way to the integrated signal processor 4 of the first embodiment, the integrated signal processor 54 combines the reproduced signals supplied from each signal processor 57 (the first to sixth signal processors 57A to 57F) to produce final reproduced signals.

Incidentally, like the first optical pickup 58A, the fourth optical pickup 58D includes a laser diode 46D and the like, which are not shown in FIG. 16. The fourth optical pickup 58D is also able to control the position of the objective lens 21D by using a position control optical beam L11 and the like. The same could be said for the fifth and sixth optical pickups 58E and 58F.

In that manner, when recording information on the optical disc 300, the optical disc device 50 uses a combination of the first and fourth optical systems 55A and 55D, a combination of the second and fifth optical systems 55B and 55E, and a combination of the third and sixth optical systems 55C and 55F to record information, which are divided into three pieces, at the same time. When reproducing information, the optical disc device 50 separately uses the first to sixth optical systems 35A to 35F at the same time.

(3-3) Operation and Effect

With the above configuration, when recording information on the optical disc 300, the optical disc device 50 of the third embodiment uses a combination of the first and fourth optical systems 55A and 55D, a combination of the second and fifth optical systems 55B and 55E, and a combination of the third and sixth optical systems 55C and 55F to record information, which are divided into three pieces, at the same time on the corresponding target positions inside the recording layer 301 of the optical disc 300.

On the other hand, when reproducing information, the optical disc device 50 separately uses the first to sixth optical systems 35A to 35F at the same time and performs a tracking control process for them. As a result, like the first and second embodiments, the pieces of information are read out from the target positions at the same time, and they are combined to produce final reproduced signals.

Accordingly, compared to a typical optical disc device that uses only one optical system to record and reproduce information from one target position at one time, the recording speed of the optical disc device 50 can be three times as fast as that of the typical optical disc device, and the reproducing speed can be six times as fast as that of the typical optical disc device.

In this case, the optical disc device 50 has to emit the optical beams to both sides of the optical disc 300 to record information. However, the optical disc device 50 only emits the optical beam to one side of the optical disc 300 to reproduce information. Accordingly, the optical disc device 50 uses each optical pickup 58 separately. This could increase the reproducing speed more than the recording speed.

Moreover, in the optical disc device 50, the wavelength of the position control optical beam L11A is set to be different from that of the recording and reproducing optical beam L23A. As a result, the optical disc device 50 can offer the same effect as the second embodiment.

According to the above configuration, the optical disc device 50 of the third embodiment divides information into three pieces, which are then recorded on the optical disc 300 at the same time by three pairs of optical systems 55. When reproducing information from the recording layer 301 of the optical disc 300, each of the first to sixth optical systems 55A to 55F reads a piece of information from the corresponding target position, and the optical disc device 50 combines them to produce the reproduced signals. Therefore, the recording and reproducing speed of information increase.

(4) Fourth Embodiment (4-1) Basic Concept for Recording and Reproducing Information A fourth embodiment of the present invention uses the same type of optical disc as the third embodiment (i.e. the optical disc 300) to record and reproduce information. Accordingly, the optical disc 300 is not described here.

(4-2) Configuration of Optical Disc Device

Figure 18:
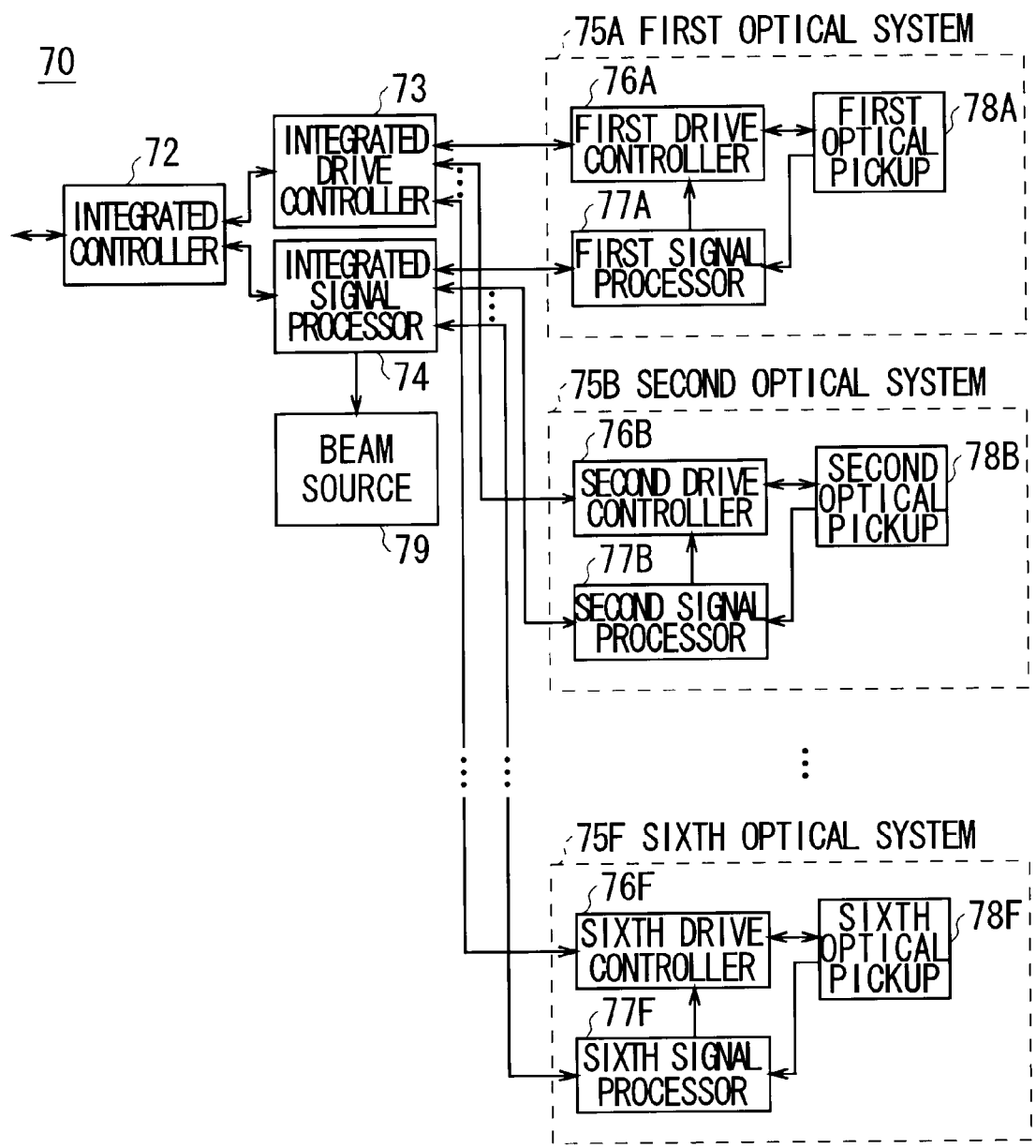
FIG. 18 is a schematic block diagram illustrating the circuit configuration of an optical disc device according to a fourth embodiment of the present invention.

As shown in FIG. 18 (which corresponds to FIGS. 2, 7 and 13), the optical disc device 70 of the fourth embodiment has an integrated controller 72, an integrated drive controller 73 and an integrated signal processor 74: They correspond to the integrated controller 2, the integrated drive controller 3 and the integrated signal processor 4, respectively.

Moreover, the optical disc device 70 includes first to sixth optical systems 75A to 75F, which correspond to the first to sixth optical system 5A to 5F, respectively. Compared to the first to third optical systems 55A to 55C of the optical disc device 50 of the third embodiment, the first to third optical systems 75A to 75C of the optical disc device 70 does not have the first to third beam sources 59A to 59C; but a first drive controller 76A, a first signal processor 77A and a first optical pickup 78A are configured in a similar way to the first drive controller 56A, the first signal processor 57A and the first optical pickup 58A.

Moreover, the fourth to sixth optical systems 75D to 75F are configured in a similar way to the fourth to sixth optical systems 55D to 55F of the third embodiment.

Figure 19:
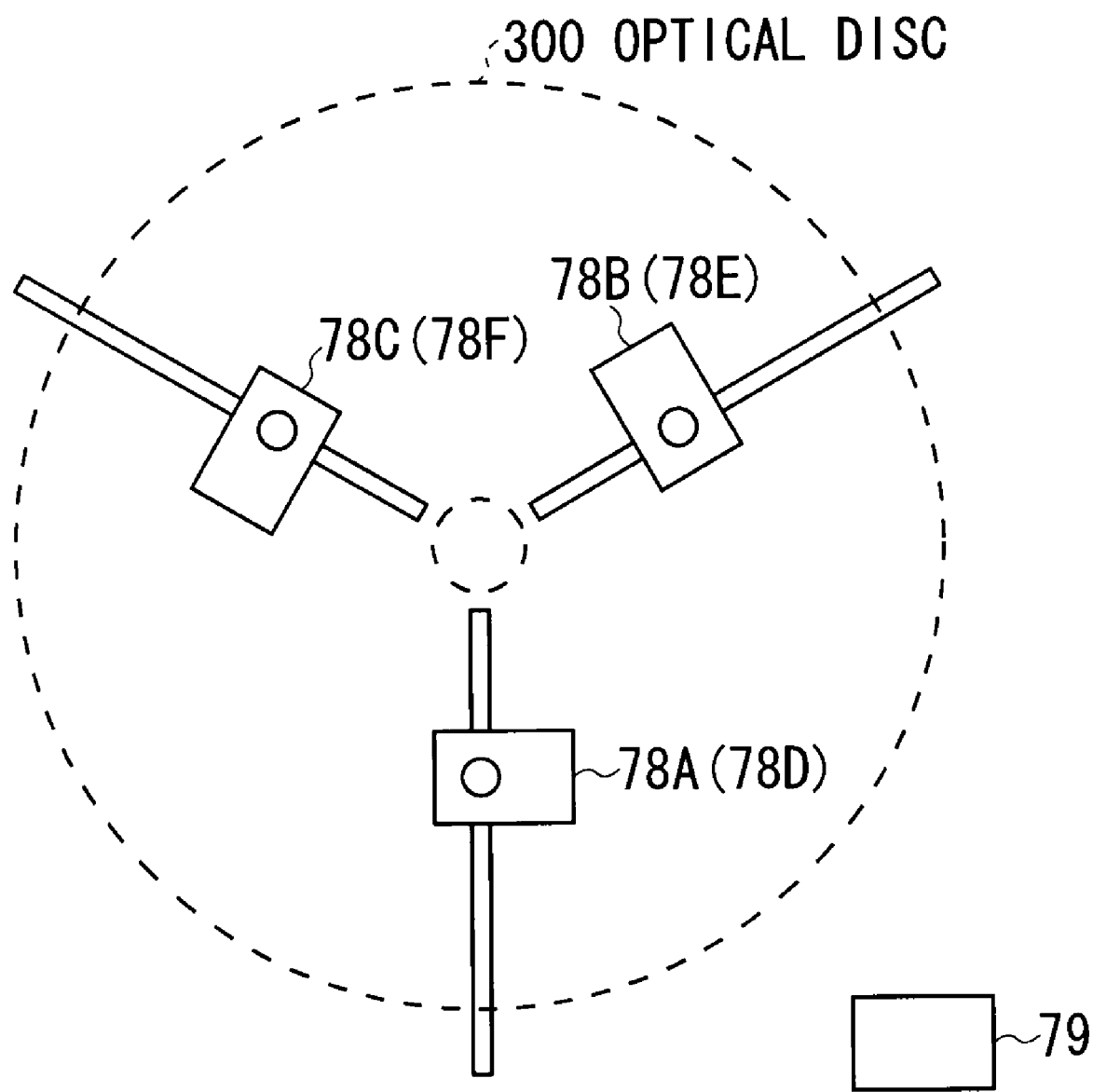
FIG. 19 is a schematic top view of an optical disc device according to a fourth embodiment of the present invention (1)

In reality, as shown in FIG. 19 (which corresponds to FIGS. 3, 8 and 14), the optical disc device 70 only has one beam source 79, like the second embodiment (FIG. 8). Incidentally, the optical disc device 70 uses a distribution optical path (not shown) to supply the optical beam emitted from the beam source 79 to the first to sixth optical pickups 78A to 78F.

Figure 20:
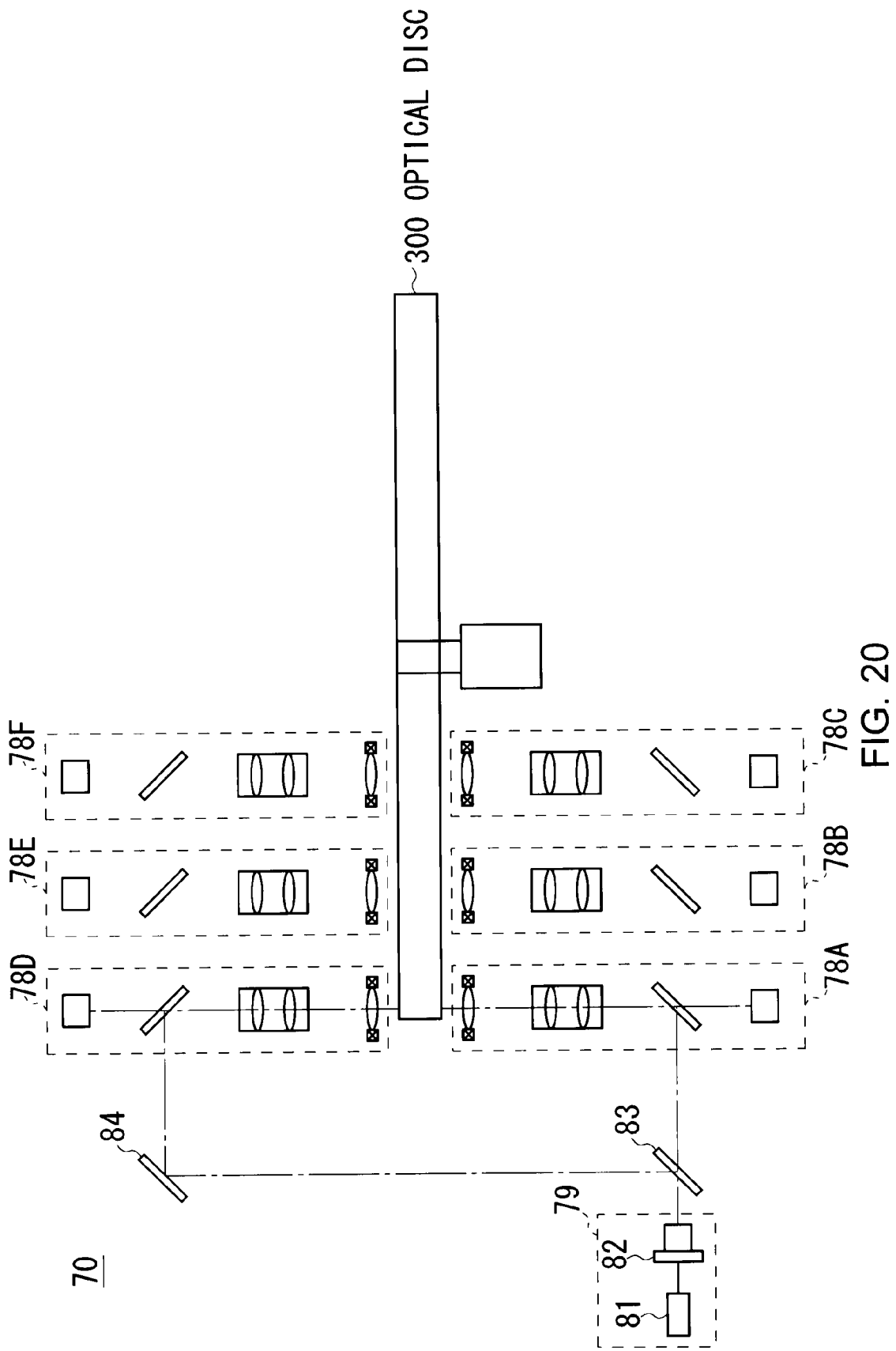
FIG. 20 is a schematic diagram illustrating the configuration of an optical disc device according to a fourth embodiment of the present invention (2)

In this manner, the optical disc device 70 only has one beam source 79. When recording information on the optical disc 300, as shown in FIG. 20 (which corresponds to FIG. 15), the optical disc device 70 only uses a combination of the first and fourth optical systems 75A and 75D to record information.

Figure 21:
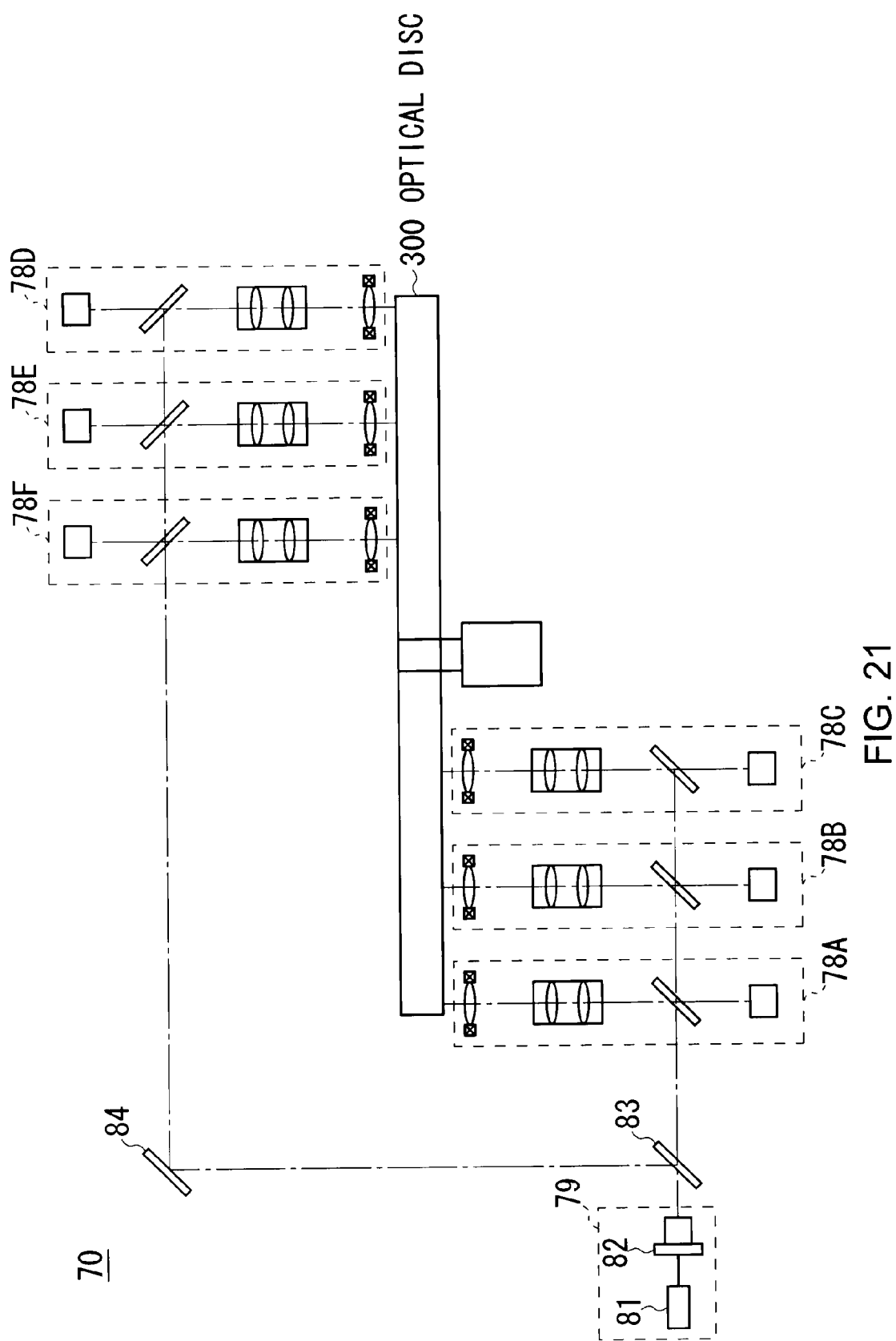
FIG. 21 is a schematic diagram illustrating the configuration of an optical disc device according to a fourth embodiment of the present invention (3)

Moreover, when reproducing information from the optical disc 300, as shown in FIG. 21, like the second embodiment (FIG. 11), the optical disc device 70 supplies the recording and reproducing optical beam L23A emitted from a laser diode 82 of the beam source 79 to the first to sixth optical pickups 78A to 78F of the first to sixth optical systems 75A to 75F by using a beam splitter 83, a mirror 84 and the like.

In a similar way to the first to sixth optical pickups 58A to 58F of the third embodiment, the first to sixth optical pickups 78A to 78F of the first to sixth optical systems 75A to 75F are designed to reproduce the pieces of information from the recording layer 301 of the optical disc 300 at the same time.

In this manner, the optical disc device 70 only uses a pair of the first and fourth optical systems 75A and 75D to record information. The optical disc device 70 separately uses the first to sixth optical systems 75A to 75F at the same time to reproduce information.

(4-3) Operation and Effect

With the above configuration, when recording information on the optical disc 300, the optical system 70 of the fourth embodiment only uses a pair of the first and fourth optical systems 75A and 75D to record information at a target position inside the recording layer 301 of the optical disc 300.

On the other hand, when reproducing information from the optical disc 300, the optical disc device 70 separately uses the first to sixth optical systems 75A to 75F at the same time and performs a tracking control process for them. As a result, like the first, second and third embodiments, the pieces of information are read out from the target positions at the same time, and they are combined to produce final reproduced signals.

Accordingly, compared to a typical optical disc device that uses only one optical system to record and reproduce information from one target position at one time, the recording speed of the optical disc device 70 is the same as that of the typical optical disc device, but the reproducing speed can be six times as fast as that of the typical optical disc device.

Especially, the optical disc device 70 only has one beam source 79, compared to the optical disc device 50 of the third embodiment (FIG. 15). Therefore, the number of components of the optical disc device 70 can be reduced, simplifying the structure.

Moreover, in the optical disc device 70, the wavelength of the position control optical beam L11A is set to be different from that of the recording and reproducing optical beam L23A. As a result, the optical disc device 70 can offer the same effect as the second and third embodiment.

According to the above configuration, the optical disc device 70 of the fourth embodiment uses only one pair of optical systems 75 to record information on the optical disc 300. When reproducing information from the recording layer 301 of the optical disc 300, each of the first to sixth optical systems 75A to 75F reads a piece of information from the corresponding target position, and the optical disc device 70 combines them to produce the reproduced signals. Therefore, the recording and reproducing speed of information can be increased while preventing the structure from getting complicated.

(5) Other Embodiments

Figure 22:
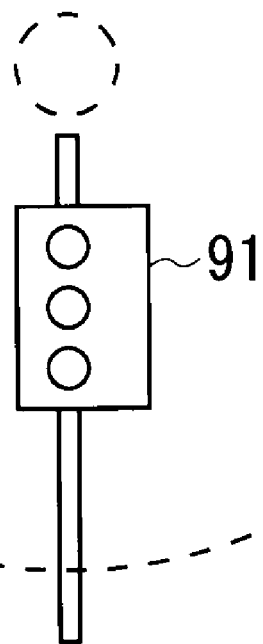
FIG. 22 is a schematic diagram illustrating the configuration of an optical disc device according to another embodiment of the present invention.

In the above-noted embodiment, as illustrated in FIGS. 3, 8, 14 and 19, each optical pickup is separately controlled in the tracking direction. However, the present invention is not limited to this. For example, as shown in FIG. 22, an optical disc device 90 may have an optical pickup 91 that contains a plurality of optical pickups, and control the optical pickup 91 in the tracking direction.

In this optical pickup 91, the distance between adjacent objective lenses and the like may be kept. In addition, the relative position between the target positions of the objective lens may also be maintained. Based on that premise, the information may be divided and delivered to each optical pickup.

Moreover, in the above-noted embodiment, the optical disc device has six optical pickups 8. However, the present invention is not limited to this. The optical disc device may have more or less than six optical pickups as long as it has at least two. Particularly, if it is configured in a similar way to those of the first and second embodiments, the optical disc device does not have to have two optical pickups facing one another because it only emits one optical beam for recording and reproducing information: There may be a certain distance between them to be offset. Alternatively, the number of optical pickups 8 provided above the optical disc may be different from the number of optical pickups 8 provided under the optical disc.

Furthermore, in the above-noted first embodiment, the recording and reproducing optical beam L3A and the position control optical beam L2A have the same wavelength because they are produced from the same optical beam L1A by the beam splitter 15A. They are emitted to the optical disc 100. However, the present invention is not limited to this. Like the second embodiment, the position control optical beam L11A with a wavelength of about 660 nm and the recording and reproducing optical beam L13A with a wavelength of about 405 nm may be emitted to the optical disc 100.

In a similar way to the first embodiment, the device of the second embodiment may emit the recording and reproducing optical beam L3A and the position control optical beam L2A, both of which have the same wavelength, to the optical disc 200.

Furthermore, in the first embodiment, there are two reflection and transmission films 104 and 105, which are used for identifying the position on the optical disc 100; in the second to fourth embodiments, only one reflection and transmission film 204 (or 304) is provided as a position reference layer for the optical disc 200 (or 300). However, the present invention is not limited to this. For example, the optical disc 100 may have only the reflection and transmission film 104; the optical disc 200 may have two reflection and transmission films on both sides of the recording layer 201; it may have three or more reflection and transmission films.

The reflection and transmission films may be not placed at the boundary of the recording layer 101 and the base plate 102 or the like. Instead, the reflection and transmission film 104 may be provided at the center of the recording layer 101. Note that the recording medium may need to have a recording layer, on which a recording mark is formed, and a position reference layer, separately, so that they are attached to one another.

Furthermore, in the first embodiment, the recording and reproducing optical beam and the position control optical beam have the same wavelength; and in the second to fourth embodiments, the recording and reproducing optical beam and the position control optical beam have different wavelengths. However, the present invention is not limited to this. In the first embodiment, the recording and reproducing optical beam and the position control optical beam may have different wavelengths; and in the second to fourth embodiments, the recording and reproducing optical beam and the position control optical beam have the same wavelength.

Moreover, the wavelength of the recording and reproducing optical beam may not be 405 nm. The wavelength of the position control optical beam may not be 660 nm. In this case, according to the wavelengths of the optical beams, the materials may be appropriately selected for the recording layer 101 of the optical disc 101, the reflection and transmission film 104 and the like; the optical components of the optical pickups may be appropriately selected; and they may be designed appropriately.

Furthermore, in the above-noted first embodiment, the recording optical beam Lw is focused on the target position inside the recording layer 101 of the initialized optical information recording medium 100, and therefore a recording mark RM with a high reflectance is formed at the target position. However, the present invention is not limited to this. The recording layer may be initialized so that the refractive index changes over the recording layer; and, by focusing the recording optical beam Lw on the recording layer, the recording layer around the target position locally changes in quality, thereby forming a recording mark RM with low reflectance. Alternatively, by focusing the recording optical beam Lw on the recording layer, a cavity may be produced around the target position as a recording mark RM: As a result, the reflectance around the circumference of the cavity increases. In that manner, the recording mark RM that has a different reflectance from the surrounding is produced by focusing the recording optical beam on the initialized recording layer and increasing the temperature around the target position to transform the quality of the recording layer.

Incidentally, when a cavity is produced around the target position, gases produced as a result of vaporization of the photopolymerizable photopolymer around the target position may be absorbed by the surrounding photopolymerizable photopolymer, or may be released through small holes to the outside.

Furthermore, in the above-noted embodiment, the optical disc device 1, which is the equivalent of an optical information recording device, includes: the integrated controller 2, which is the equivalent of an acquisition section; the first, second and third optical systems 5A, 5B and 5C, which are the equivalent of an one-surface recording section; and the fourth, fifth and sixth optical systems 5D, 5E and 5F, which are the equivalent of an other-surface recording section. However, the present invention is not limited to this. The optical information recording device may be configured in a different manner, including the acquisition section, the one-surface recording section and the other-surface recording section.

Furthermore, in the above-noted embodiment, the optical disc device 50, which is the equivalent of an optical information recording device, includes: the integrated controller 52, which is the equivalent of an acquisition section; and the first, second, third, fourth, fifth and sixth optical systems 55A, 55B, 55C, 55D, 55E and 55F, which are the equivalent of a recording section. However, the present invention is not limited to this. The optical information recording device may be configured in a different manner, including the acquisition section and the recording section.

The above method can be applied to various types of optical disc device, which record information on an optical disc using a hologram.

It should be understood by those skilled in the art that various modifications, combinations, sub-combinations and alterations may occur depending on design requirements and other factors insofar as they are within the scope of the appended claims or the equivalents thereof.

What is claimed is:

1. An optical information recording device comprising:
  an acquisition section configured to acquire recording information to be recorded on an optical information recording medium, the recording information being recorded by forming a recording mark at a position where an optical beam is focused and being reproduced based on an optical reflectance of the recording mark;
  an information control section configured to divide the recording information based on the number of one-surface beam emission sections and other-surface beam emission sections;
  a one-surface recording section including at least one one-surface beam emission section configured to
    emit a one-surface recording beam, based on part of the recording information divided by the information control section, to one surface of the optical information recording medium, and
    focus the one-surface recording beam on a predetermined target position to form the recording mark, the one-surface recording section using the at least one one-surface beam emission section to form recording marks at the same time; and
  an other-surface recording section including at least one other-surface beam emission section configured to
    emit an other-surface recording beam, based on a remainder of the recording information divided by the information control section, to the other surface of the optical information recording medium, and
    focus the other-surface recording beam on a predetermined target position to form the recording mark, the other-surface recording section using the at least one other-surface beam emission section to form recording marks at the same time as the one-surface beam emission section.

2. The optical information recording device according to claim 1, wherein
  the at least one one-surface beam emission section
    emits a predetermined one-surface position control beam to a first position reference layer of the optical information recording medium, and
    controls a position of a one-surface objective lens, based on a reflection of the one-surface position control beam, to focus the one-surface recording beam on the target position, the one-surface objective lens collecting the one-surface recording beam, and
  the at least one other-surface beam emission section
    emits a predetermined other-surface position control beam to a second position reference layer of the optical information recording medium, and
    controls a position of an other-surface objective lens, based on a reflection of the other-surface position control beam, to focus the other-surface recording beam on the target position, the second position reference layer being different from the first position reference layer and the other-surface objective lens collecting the other-surface recording beam.

3. The optical information recording device according to claim 1, wherein
  the target position of the at least one one-surface beam emission section is located in a one-surface-side information recording layer that is one of a plurality of information recording layers of the optical information recording medium on which the recording mark is recorded, the one-surface-side information recording layer being closer to the one surface than to the other surface, and
  the target position of the at least one other-surface beam emission section is located in an other-surface-side information recording layer that is one of the plurality of information recording layers of the optical information recording medium, the other-surface-side information recording layer being closer to the other surface than to the one surface.

4. The optical information recording device according to claim 1, wherein
  the optical information recording medium is made from a photopolymerizable photopolymer, a photocrosslinkable photopolymer or a photopolymerizable, and a photocrosslinkable photopolymer that includes organometallic and/or inorganic metallic compounds, the optical information recording medium being photopolymerized and/or photocrosslinked as a result of being exposed to a predetermined initialization beam, and
  the at least one one-surface beam emission section and the at least one other-surface beam emission section increase temperature around the target position and change the optical information recording medium in quality to form the recording mark.

5. The optical information recording device according to claim 1, wherein
  a volume hologram is previously formed on the optical information recording medium by initialization,
  the at least one one-surface beam emission section forms the recording mark by emitting the one-surface recording beam and breaking the volume hologram around the target position, and
  the at least one other-surface beam emission section forms the recording mark by emitting the other-surface recording beam and breaking the volume hologram around the target position.

6. The optical information recording device according to claim 5, wherein, when reproducing information from the optical information recording medium, the information differs based on whether the information located at the target position is within the volume hologram or the recording mark.

7. The optical information recording device according to claim 5, wherein the recording mark is formed outside the volume hologram.

8. An optical information recording method, comprising:
    acquiring recording information to be recorded on an optical information recording medium, the information being recorded by forming a recording mark at a position where an optical beam is focused and being reproduced based on an optical reflectance of the recording mark;
    dividing, at an information control section, the recording information based on the number of one-surface beam emission sections and other-surface beam emission sections;
    emitting, via at least one one-surface beam emission section, a one-surface recording beam, based on part of the recording information divided by the information control section, to one surface of the optical information recording medium;
    focusing the one-surface recording beam on a predetermined target position to form the recording mark, the at least one one-surface beam emission section forming recording marks at the same time; and
    emitting, via at least one other-surface beam emission an other-surface recording beam, based on a remainder of the recording information divided by the information control section, to the other surface of the optical information recording medium; and
    focusing the other-surface recording beam on a predetermined target position to form the recording mark, the at least one other-surface beam emission forming recording marks at the same time as the one-surface beam emission section.

* * * * *